(12) United States Patent
Kuo et al.

(10) Patent No.: US 10,090,883 B2
(45) Date of Patent: Oct. 2, 2018

(54) RADIO FREQUENCY INTERCONNECT HAVING A PREAMBLE GENERATOR

(71) Applicant: TAIWAN SEMICONDUCTOR MANUFACTURING COMPANY, LTD., Hsinchu (TW)

(72) Inventors: Feng Wei Kuo, Zhudong Township (TW); William Wu Shen, Hsinchu (TW); Chewn-Pu Jou, Hsinchu (TW); Huan-Neng Chen, Taichung (TW); Lan-Chou Cho, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 0 days.

(21) Appl. No.: 14/969,305

(22) Filed: Dec. 15, 2015

(65) Prior Publication Data
US 2017/0170872 A1 Jun. 15, 2017

(51) Int. Cl.
| | | |
|---|---|---|
| *H03K 7/06* | (2006.01) | |
| *H04B 3/50* | (2006.01) | |
| *H04L 27/12* | (2006.01) | |
| *H04L 27/148* | (2006.01) | |
| *H04L 27/152* | (2006.01) | |
| *H04L 5/00* | (2006.01) | |

(52) U.S. Cl.
CPC ............ *H04B 3/50* (2013.01); *H04L 5/0048* (2013.01); *H04L 27/12* (2013.01); *H04L 27/148* (2013.01); *H04L 27/152* (2013.01)

(58) Field of Classification Search
CPC ......... H04B 3/50; H04L 27/12; H04L 27/148; H04L 5/0048

USPC .......................... 375/295, 271; 370/310, 500
See application file for complete search history.

(56) References Cited

U.S. PATENT DOCUMENTS

| | | | |
|---|---|---|---|
| 8,279,008 B2 | 10/2012 | Hsieh et al. | |
| 8,427,240 B2 | 4/2013 | Hsieh et al. | |
| 8,593,206 B2 | 11/2013 | Chen et al. | |
| 8,610,494 B1 | 12/2013 | Jin et al. | |
| 8,618,631 B2 | 12/2013 | Jin et al. | |
| 2001/0001616 A1* | 5/2001 | Rakib | H03M 13/256 375/259 |
| 2011/0216816 A1* | 9/2011 | Frenzel | H04B 1/38 375/222 |
| 2012/0092230 A1 | 4/2012 | Hung et al. | |
| 2012/0262340 A1* | 10/2012 | Hassan | G01S 11/02 342/458 |

(Continued)

*Primary Examiner* — Leila Malek
(74) *Attorney, Agent, or Firm* — Hauptman Ham, LLP

(57) ABSTRACT

A radio frequency interconnect includes a transmitter coupled with an input end of a transmission line, and a receiver coupled with an output end of the transmission line. The transmitter includes a first carrier generator configured to generate a clock recovery signal based on a carrier signal, to output a reference clock signal, and to transmit the clock recovery signal to the receiver. The transmitter also includes a modulator configured to modulate a data packet based on the carrier signal. The transmitter also includes a preamble generator configured to generate and add a preamble to data to generate the data packet. The preamble includes a data sequence associated with the reference clock signal. The transmitter further includes a transmitter output configured to transmit the modulated data packet to the receiver by the transmission line.

20 Claims, 12 Drawing Sheets

(56) References Cited

U.S. PATENT DOCUMENTS

| | | | |
|---|---|---|---|
| 2013/0107835 A1* | 5/2013 | Aiba | ................ H04L 5/0007 |
| | | | 370/329 |
| 2013/0234305 A1 | 9/2013 | Lin et al. | |
| 2014/0132333 A1 | 5/2014 | Jin et al. | |
| 2014/0217546 A1 | 8/2014 | Yen et al. | |
| 2014/0253262 A1 | 9/2014 | Hsieh et al. | |
| 2014/0253391 A1 | 9/2014 | Yen | |

* cited by examiner

| Preamble | DESADDR | Burst Count | SADDR | DATA | CRC |
|---|---|---|---|---|---|
| 4/8/12/16 bits | 0-5 bytes | 0/1 bytes | 0-5 bytes | 1-32 bytes | 0/2bytes |

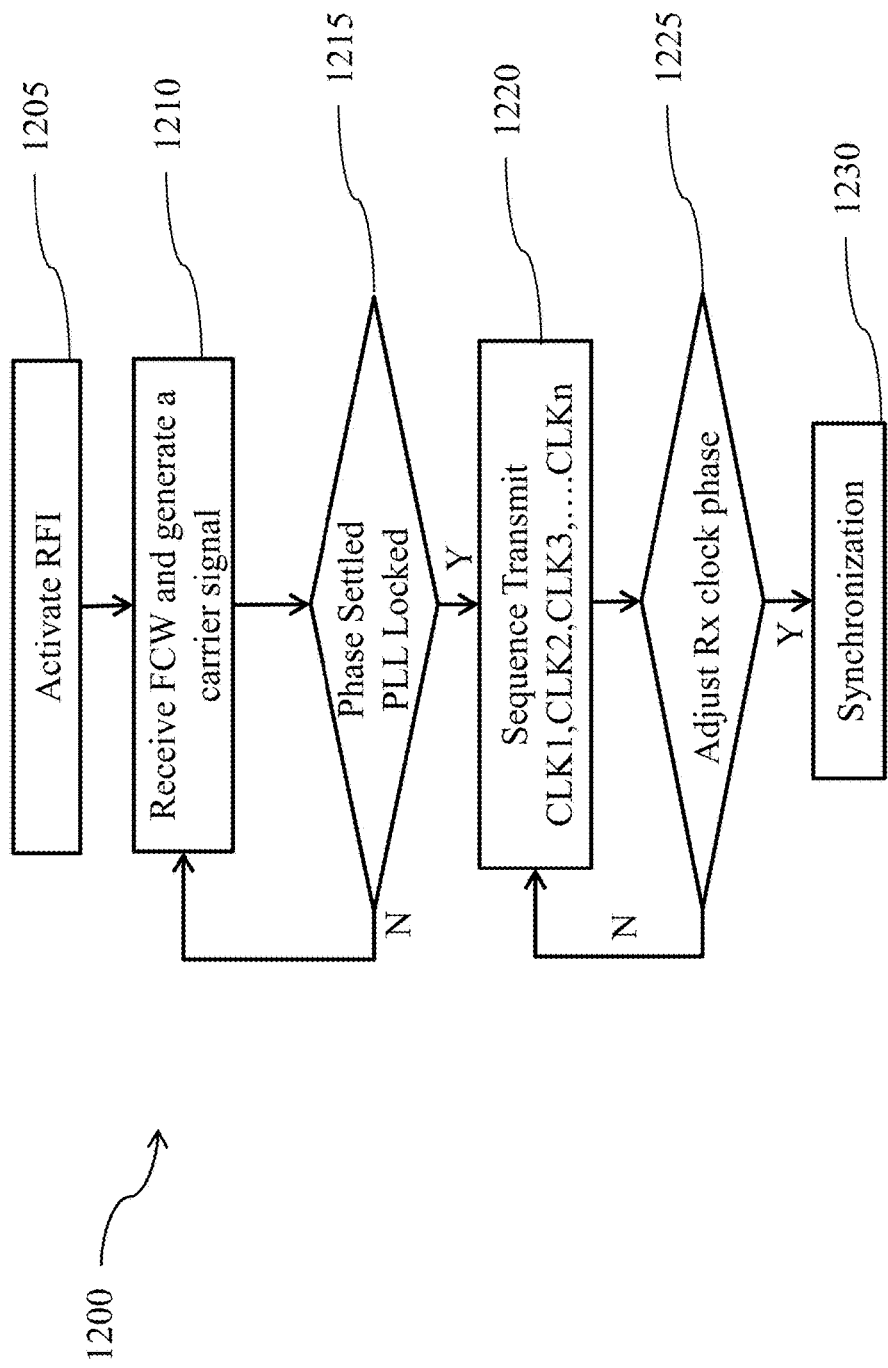

RADIO FREQUENCY INTERCONNECT HAVING A PREAMBLE GENERATOR

BACKGROUND

In a packaged integrated circuit, there are many individual devices such as memory, an analog-to-digital converter, wireless communication devices, an application processor, and similar devices. The individual devices often communicate using a bus such as Serial Peripheral Interface (SPI) or Inter-Integrated Circuit (I²C). Alternatively, some devices communicate by a radio frequency interconnect (RFI).

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 8 is a block diagram of a data packet, in accordance with some embodiments.

FIG. 12 is a flowchart of a method of synchronizing a transmitter and a receiver for transmission of data in an RFI, in accordance with some embodiments.

DETAILED DESCRIPTION

Figure 1:
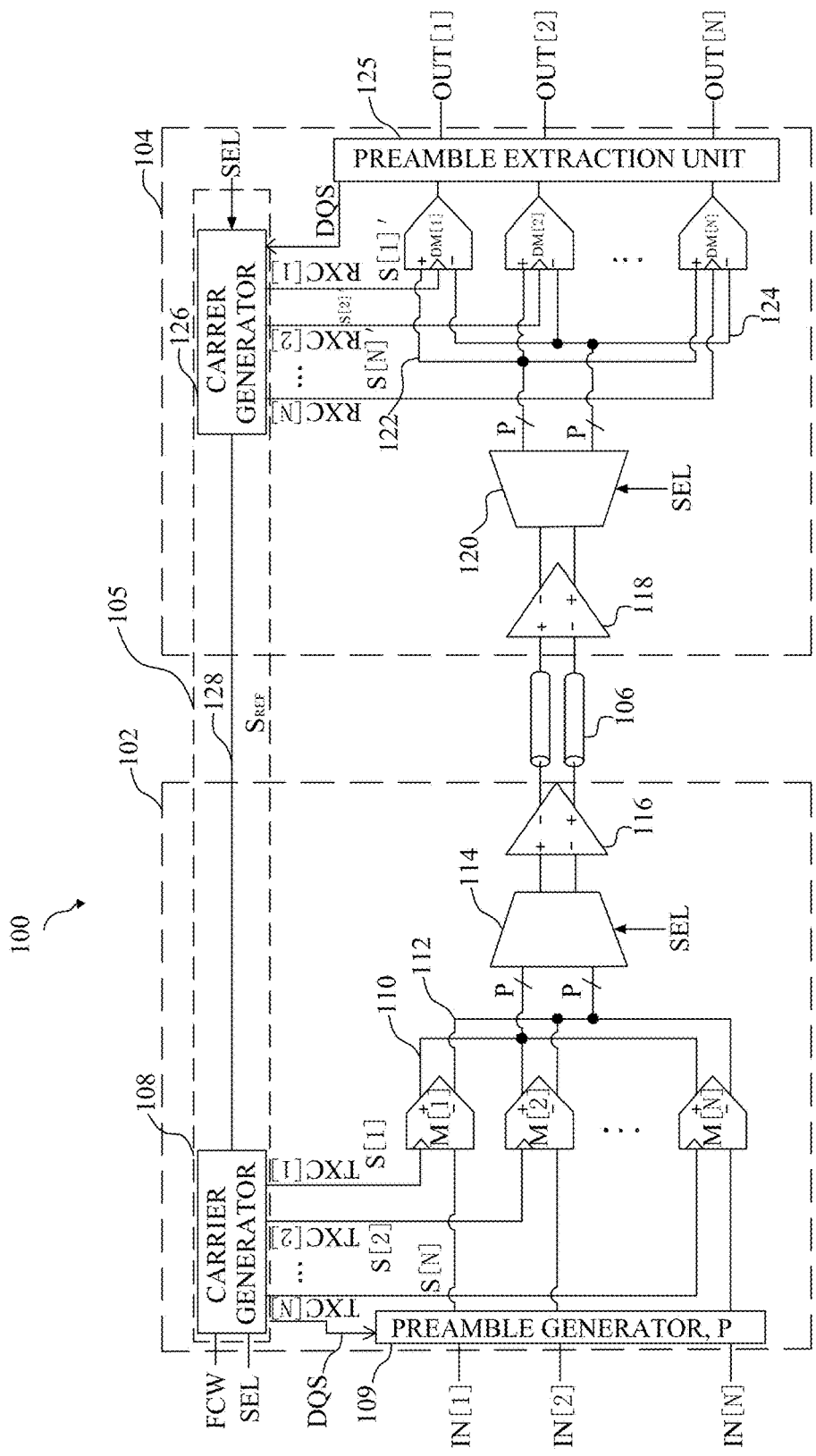
FIG. 1 is a block diagram of a Radio Frequency Interconnect (RFI) that connects devices, in accordance with some embodiments.

The following disclosure provides different embodiments, or examples, for implementing features of the provided subject matter. Specific examples of components and arrangements are described below to simplify the present disclosure. These are, of course, merely examples and are not limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

The radio frequency interconnect (RFI) discussed herein connects individual components by a differential transmission line. In some embodiments, the individual components are on a single substrate. In some embodiments, the individual components are on separate substrates. In some embodiments, the individual components include at least one of a memory device, a wireless communication device, e.g., a Bluetooth® module, a Zigbee® module, an IEEE 802.11 wireless networking module, or another suitable wireless communication device, an analog-to-digital converter, a digital-to-analog converter, a sensor module, a discrete application processor for performing operations in a low power state, a hardware processor, a memory controller, or another suitable device.

In some embodiments, a single device using a large bandwidth, e.g., a memory, is coupled to a processor by a transmission line. In some embodiments, two or more devices are coupled to the processor by a transmission line. In some embodiments, the transmission line includes two conductive lines suitable to transmit a signal in a differential mode. In some embodiments, the transmission line is a coplanar waveguide.

The RFI includes a transmitter and a receiver configured to link two or more devices by a transmission line to perform communication between or among the two or more devices. The RFI also includes a carrier synchronization section which includes a carrier generator configured to generate carrier signals and to generate a clock recovery signal from the carrier signals. The carrier signals are used to modulate data that is transmitted to at least one receiving device by the transmission line.

A receiving device (also referred to as a receiver) uses the clock recovery signal to regenerate the carrier signals and demodulate the received data based on the regenerated carrier signals. In some embodiments, the receiver uses a phase locked loop (PLL) to generate the clock recovery signal. In some embodiments, the receiver uses a single PLL to generate the clock recovery signal. The RFI is usable in different integrated circuits that are packaged by a 2D, a 2.5D, or a 3D packaging technique, thereby conserving space by reducing a number of electrical interconnects relative to other techniques. The RFI replaces a bus having a large number of individual lines. The RFI helps to save power and reduce an area occupied on the integrated circuit in comparison to prior approaches.

FIG. 1 is a block diagram of a Radio Frequency Interconnect (RFI) 100 that connects devices, in accordance with some embodiments. RFI 100 includes a transmitter 102 that is coupled to a receiver 104 by a transmission line 106. RFI 100 also includes a carrier synchronization section 105 which connects transmitter 102 to receiver 104. Transmitter 102 includes data input terminals that are coupled to input data lines IN[1] to IN[N] (collectively referred to as "input data lines IN"), where N is a positive integer greater than or equal to 1. Receiver 104 includes output terminals that are coupled to output data lines OUT[1] to OUT[N], collectively referred to as "output data lines OUT."

Transmitter 102 includes a carrier generator 108 having a first input configured to receive a frequency command word (FCW) signal and a second input configured to receive a selector (SEL) signal. Carrier generator 108 includes clock output terminals that are coupled to clock input terminals of modulators M[1] to M[N] (collectively referred to as "modulators M") by carrier lines TXC[1] to TXC[N] (collectively referred to as "carrier lines TXC"), where N is a positive integer greater than or equal to 1. Carrier generator 108 has a reference clock output that is coupled to a reference clock input of a preamble generator 109. In some embodiments, carrier generator 108 includes a plurality of individual carrier generators, where each individual carrier generator is connected to a corresponding modulator of modulators M. In some embodiments, carrier generator 108 is a multi-carrier generator connected to each of modulators M.

Preamble generator 109 includes data input terminals that are coupled to the data input terminals of transmitter 102. Modulators M include data input terminals that are coupled to data output terminals of preamble generator 109. Non-inverting output terminals of modulators M are coupled to a bus 110. Inverting output terminals of modulators M are coupled to a bus 112. Bus 110 has P bits (where P is a positive integer) and is coupled to a first set of input terminals of a multiplexer 114. Bus 112 also has P bits and is coupled to a second set of input terminals of multiplexer 114.

Multiplexer 114 includes a select input terminal coupled to an external select source (not shown). Outputs of the multiplexer 114 are coupled with inputs of a differential amplifier 116. The select input terminal is configured to receive an SEL signal. The differential output terminals of differential amplifier 116 are coupled to the differential output terminals of transmitter 102, which are coupled to input terminals of transmission line 106. In some embodiments, differential amplifier 116 is an RF power amplifier.

The output terminals of transmission line 106 are coupled to differential input terminals of receiver 104, which are coupled to differential input terminals of a differential amplifier 118. In some embodiments, differential amplifier 118 is a low noise amplifier (LNA). The output terminals of differential amplifier 118 are coupled to inputs of a demultiplexer 120. A first set of output terminals of demultiplexer 120 are coupled to a bus 122 having P bits and a second set of output terminals of demultiplexer 120 are coupled to a bus 124 having P bits.

Receiver 104 includes a carrier generator 126 having clock output terminals that are coupled to a clock input of demodulators DM[1] to DM[N] (collectively referred to as "demodulators DM") by carrier lines RXC[1] to RXC[N] (collectively referred to as "carrier lines RXC"), where N is a positive integer greater than or equal to 1. Non-inverting input terminals of demodulators DM are also coupled to bus 122 and inverting input terminals of demodulators DM[N] are coupled to bus 124. Output terminals of demodulators DM are coupled to input terminals of a preamble extractor 125. Output terminals of the preamble extractor 125 are coupled to the output terminals of receiver 104, which are coupled to the data output lines OUT. A reference clock output of preamble extractor 125 is coupled with a reference clock input of carrier generator 126. Carrier generator 126 is configured to receive the SEL signal. In some embodiments, carrier generator 126 includes a plurality of individual carrier generators, where each individual carrier generator is connected to a corresponding demodulator of demodulators DM. In some embodiments, carrier generator 126 includes a multi-carrier generator connected to each of demodulators DM.

A clock output terminal of carrier generator 108 is also coupled to a clock input terminal of carrier generator 126 by line 128. In some embodiments, line 128 is a single ended line for transmitting a clock recovery signal $S_{REF}$ to receiver 104 to regenerate carrier signals S. In some embodiments, carrier generator 108 includes a multiplexer connected to line 128. In some embodiments, carrier generator 126 includes a demultiplexer connected to line 128.

Transmitter 102 is configured to receive input data by input data lines IN, add a preamble P to the data to generate a data packet, modulate the data packet based on a different carrier signal for each of the input data lines IN, and transmit the modulated data packet to receiver 104. In some embodiments, input data comprises payload data, signaling information or command information. In some embodiments, input data is usable by one or more electronic devices connected to the RFI. For example, the carrier generator 108 receives the FCW signal on the first input terminal and the SEL signal on the second input terminal. The SEL signal is configured to divide a time period $T_{PERIOD}$ into time slots T[1] to T[N] (collectively referred to as "time slots T"), where N is a positive integer greater than or equal to 1. In response to the FCW signal, carrier generator 108 is configured to generate carrier frequencies S[1] to S[N] (collectively referred to as "carrier signals S"), where N is a positive integer greater than or equal to 1. Carrier generator 108 is also configured to output the carrier signals S to the clock input terminals of modulators M. For example, based on the FCW signal and modulator M[n], where n is a positive integer ranging from 1 to N, carrier generator 108 generates a carrier signal S[n] and transmits the carrier signal S[n] to the modulator M[n] by carrier line TXC[n]. In some embodiments, the FCW signal is a ratio of a desired frequency divided by a reference frequency. In some embodiments, each of the carrier signals S on the carrier lines TXC is a continuous wave signal having a different fundamental frequency.

Carrier generator 108 is also configured to generate clock recovery signal $S_{REF}$ by time-multiplexing each of the carrier signals S for a predetermined interval, i.e., a time slot, in time period $T_{PERIOD}$, with time period $T_{PERIOD}$ being divided into T time slots. Specifically, based on the SEL signal, carrier generator 108 sequentially outputs a carrier signal S[n] in a corresponding time slot T[n], thereby causing carrier generator 108 to time-multiplex the carrier signals S into the clock recovery signal $S_{REF}$. Clock recovery signal $S_{REF}$ is output from carrier generator 108 on line 128 to carrier generator 126. Clock recovery signal $S_{REF}$ is a multi-carrier signal.

Carrier generator 108 is further configured to generate a reference clock signal DQS associated with the clock recovery signal $S_{REF}$. In some embodiments, the reference clock signal DQS is a data strobe signal that identifies which channel (e.g., time slot T) is transmitted to the receiver 104. In some embodiments, the reference clock signal DQS corresponds to a portion of the clock recovery signal $S_{REF}$ in a given time slot T. In some embodiments, the reference clock signal DQS is associated with a corresponding carrier signal S used to modulate a data packet.

Preamble generator 109 receives the reference clock signal DQS from carrier generator 109 and generates a preamble P associated with the reference clock signal DQS. In some embodiments, the preamble P comprises a data sequence associated with the reference clock signal DQS. In some embodiments, each preamble P is unique with respect to each other. In some embodiments, the preamble P is a sequence of bits indicative of a beginning portion of payload data or an end of a header portion of a data packet. In some embodiments, the reference clock signal DQS is transmitted to the receiver. Preamble generator 109 generates a preamble P, and adds preamble P to the input data received by input line IN[1] to IN[N] to generate the data packet. The preamble P is usable by receiver 104 to identify the reference clock signal DQS. Receiver 104 compares the reference clock signal DQS or a phase of the received modulated data packet with the corresponding clock recovery signal $S_{REF}$ for clock and/or phase synchronization between the transmitter 102 and the receiver 104.

Modulator M[n] receives the data packet from preamble generator 109 for transmission to receiver 104. In response to receiving the carrier signal S[n] on the clock input terminal, modulator M[n] modulates the data packet based on the carrier signal on carrier line TXC[n], and outputs the modulated data packet as a differential signal on bus 110 and bus 112. The modulator M[n] is configured to modulate the data packet based on a Quadrature Amplitude Modulation (QAM) scheme having 256 symbols (i.e., 256-QAM). In other embodiments, another modulation scheme is used or a different number of symbols is implemented (e.g., 64-QAM, 1024-QAM). In some embodiments, a phase shift key (PSK) modulation scheme is implemented.

Multiplexer 114 receives the modulated data packet from modulators M by bus 110 and 112 and receives the SEL signal by the select input terminal. In response to the SEL signal, multiplexer 114 selects modulator M[n] for a time slot T[n] and outputs the modulated data packet from the selected modulator M[n] during the time slot T[n]. As a result, multiplexer 114 receives the modulated data packet from each modulator M, time-multiplexes the modulated data packet for each modulator M during time period $T_{PERIOD}$ and outputs the multiplexed data packet.

Differential amplifier 116 receives the multiplexed data packet, amplifies the multiplexed data packet for transmission, and transmits the amplified data packet to receiver 104 by the transmission line 106.

Receiver 104 is configured to demodulate the received data packet from the transmitter 102 by regenerating the carrier signals S'. Specifically, carrier generator 126 receives the clock recovery signal $S_{REF}$ on line 128 by the first input terminal, the SEL signal by the second input terminal and the reference clock signal DQS on a third terminal. In response to the clock recovery signal $S_{REF}$, the SEL signal and reference clock signal DQS, carrier generator 126 regenerates the carrier signals S' and outputs the carrier signals S' on the carrier lines RXC.

The differential input terminals of differential amplifier 118 receive the transmitted modulated data packet from transmitter 102 by output ports of transmission line 106. In response to receiving the modulated data packet, differential amplifier 118 amplifies the received modulated data packet and outputs the amplified modulated data packet.

Demultiplexer 120 receives the amplified modulated data packet and receives the SEL signal by the select input terminal. In response to the SEL signal during each time period $T_{PERIOD}$, demultiplexer 120 sequentially selects and outputs the data packet to demodulators DM by bus 122 and bus 124. For example, during time slot T[n], demultiplexer 120 selects an output terminal coupled to bus 122 that is coupled to the non-inverting input of demodulator DM[n] and an output terminal coupled to bus 124 that is coupled to the inverting input terminal of demodulator DM[n]. In response to selecting the output terminals, demultiplexer 120 outputs the modulated data packet to the selected demodulator DM[n] during the corresponding time slot T[n]. Demodulators DM receive the amplified signal for a single time slot from the time slots T and receive the carrier signals S' on carrier lines RXC. In response to receiving the modulated data packet, demodulators DM demodulate the modulated data packet based on the carrier signals S and output the transmitted data packet.

Preamble extractor 125 receives the demodulated data packet and extracts the preamble portion P of the demodulated data packet. Preamble extractor 125 outputs the remaining portion of the data packet (e.g., a portion of the demodulated data packet that does not include the preamble P) to the output data lines OUT. In some embodiments, preamble extractor 125 is configured to separate the demodulated data packet into the preamble and the payload data for the device of the integrated circuit. Preamble extractor 125 outputs the reference clock signal DQS to carrier generator 126. In some embodiments, preamble extractor 125 outputs the reference clock signal DQS to carrier generator 126 to identify the corresponding carrier signal S in the clock recovery signal $S_{REF}$ for clock synchronization between receiver 104 and transmitter 102. In some embodiments, the reference clock signal DQS includes a divided clock divided reference clock signal REF_CLK/N.

Figure 2:
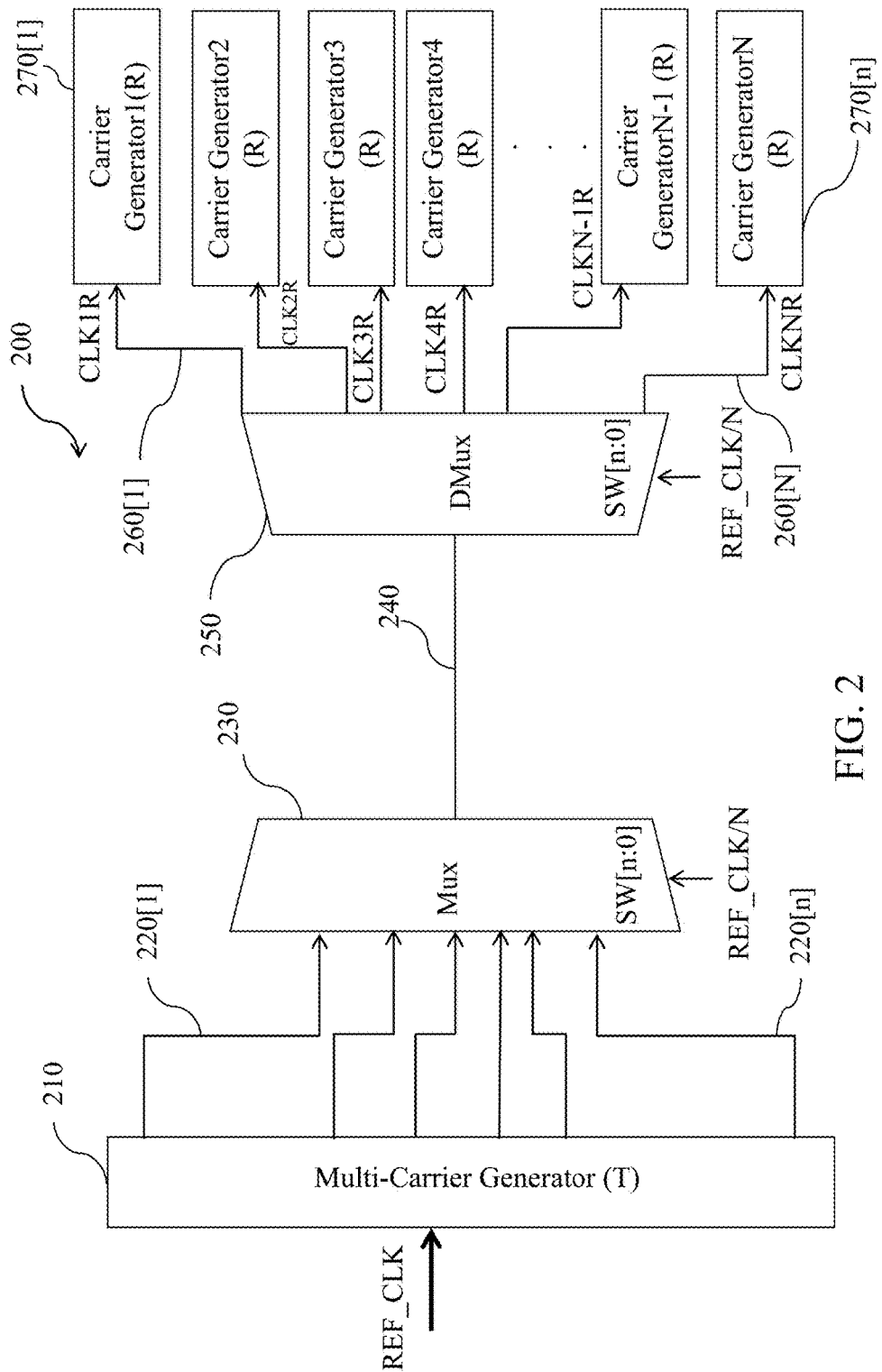
FIG. 2 is a block diagram of a carrier synchronization section of an RFI, in accordance with some embodiments.

FIG. 2 is a block diagram of a carrier synchronization section 200 of an RFI, in accordance with some embodiments. In some embodiments, carrier synchronization section 200 is usable as carrier synchronization section 105 in RFI 100 (FIG. 1). Carrier synchronization section 200 includes a multi-carrier generator 210. Multi-carrier generator 210 is configured to generate a reference carrier signal. Multi-carrier generator 210 is connected to a multiplexer 230 by a plurality of lines 220 [1] to 220[n], collectively referred to as lines 220. Multi-carrier generator 210 is also configured to generate carrier signals for modulators in the RFI, e.g., modulators M in RFI 100. A selector input of multiplexer 230 is configured to receive the divided reference clock signal REF_CLK/N. Multiplexer 230 is configured to transmit reference carrier signals from multi-carrier generator 210 along a line 240 in a time division multiplexing scheme. In some embodiments, multi-carrier generator 210 is usable as carrier generator 108 in RFI 100 (FIG. 1). In some embodiments, multi-carrier generator 210 is separated into a plurality of carrier generators.

Line 240 connects multiplexer 230 with a demultiplexer 250. In some embodiments, line 240 is a transmission line. Demultiplexer 250 is configured to receive the divided reference clock signal REF_CLK/N at a selector input. In some embodiments, divided reference clock signal REF_CLK/N received by a selector input of demultiplexer 250 includes reference clock signal DQS or preamble P[n]. Demultiplexer 250 is configured to output separated reference carrier signals CLK1R to CLKNR to corresponding carrier generators 270[1] to 270[n], collectively referred to as carrier generators 270, along lines 260[1] to 260[n], collectively referred to as lines 260. Carrier generators 270 are configured to output carrier signals to demodulators of the RFI, e.g., demodulators DM of RFI 100 (FIG. 1). In some embodiments, carrier generators 270, lines 260 and demultiplexer 250 are arranged in a multi-carrier generator configuration, e.g., carrier generator 126 (FIG. 1).

Figure 3:
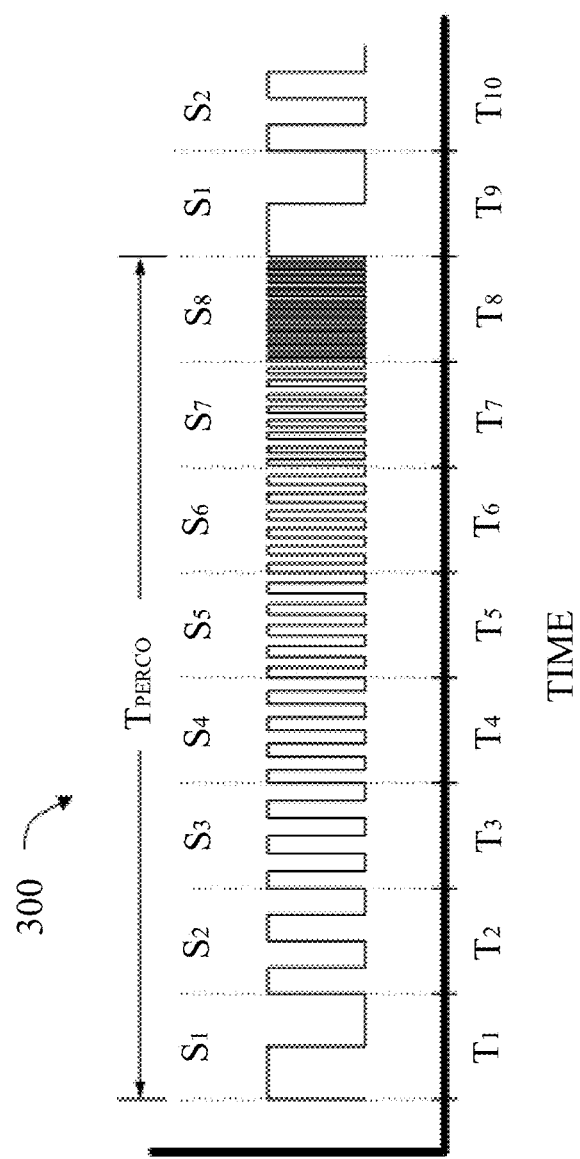
FIG. 3 is a timing diagram of a clock recovery signal SREF generated by a carrier generator of an RFI, in accordance with some embodiments.

FIG. 3 is a timing diagram 300 of a clock recovery signal $S_{REF}$ generated by a carrier generator of an RFI in accordance with some embodiments. In some embodiments, clock recovery signal $S_{REF}$ is generated by multi-carrier generator 210 (FIG. 2). In some embodiments, clock recovery signal $S_{REF}$ is generated by carrier generator 108 (FIG. 1).

Clock recovery signal $S_{REF}$ includes reference carrier signals S that are time-multiplexed and transmitted during time period $T_{PERIOD}$, which is divided into time slots T.

Each time slot T[n] in time slots T has a substantially equal time duration and carries a single reference carrier signal S[n] from reference carrier signals S, and each of the reference carrier signals S has a different frequency. In some embodiments, any one of reference carrier signals S is a continuous wave signal, e.g., a sinusoidal waveform, a triangle waveform, or another suitable waveform. After time period $T_{PERIOD}$ (i.e., time period T[N+1]), clock recovery signal $S_{REF}$ is continually generated and transmitted beginning with carrier signal S[1] at time period T[N+1]. In some embodiments, at least one time slot T[n] has a different time duration from at least another time slot.

Figure 4:
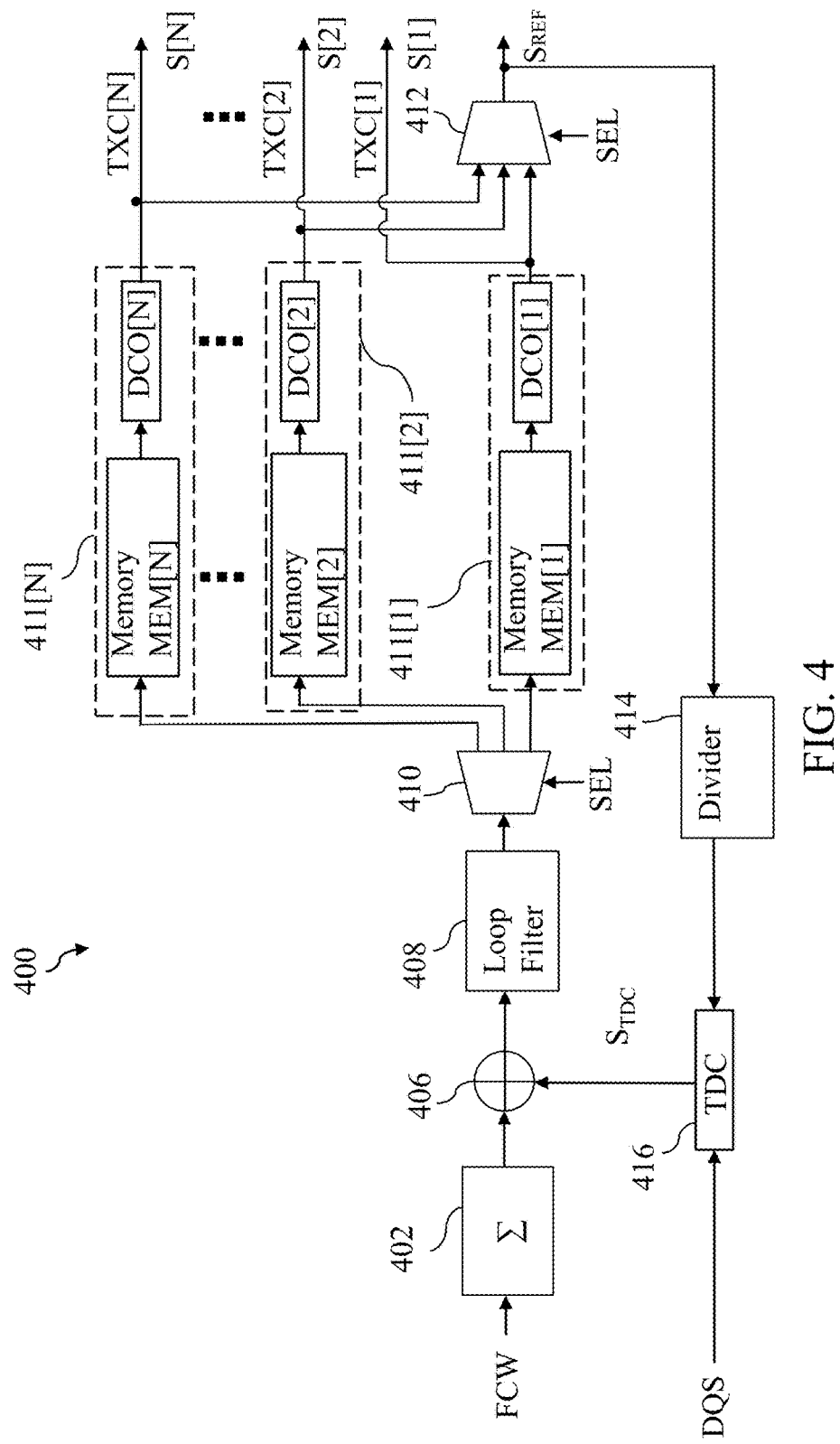
FIG. 4 is a block diagram of a carrier generator for generating carrier signals and for generating a clock recovery signal in an RFI, in accordance with some embodiments.

FIG. 4 is a block diagram of a carrier generator 400 for generating carrier signals S and for generating a clock recovery signal $S_{REF}$ in an RFI, in accordance with some embodiments. In some embodiments, the RFI is RFI 100 (FIG. 1). In some embodiments, carrier generator 400 is usable as multi-carrier generator 210 (FIG. 2). Carrier generator 400 includes a single loop PLL configured to generate the clock recovery signal $S_{REF}$. The PLL is configured to allow the carrier signals S' on carrier lines RXC (FIG. 1) to be synchronized in frequency and phase with the carrier signals S on carrier lines TXC. In some embodiments, the PLL also helps to account for phase shifts in the received clock signal resulting from transmission through line 128 (FIG. 1) of the RFI. Carrier generator 400 includes an all-digital PLL (ADPLL). Carrier generator 400 is configured to synchronize the clock recovery signal with the carrier signals S within a predefined tolerance.

Carrier generator 400 includes a first input terminal coupled to an input terminal of a phase accumulator 402. An output terminal of phase accumulator 402 is coupled to a first input of an adder 406. An output terminal of adder 406 is coupled to an input terminal of a loop filter 408. An output terminal of loop filter 408 is coupled to an input terminal of a demultiplexer 410. Demultiplexer 410 includes a select input terminal for receiving an SEL signal and output terminals that are coupled to an input terminal of tuning arrangements 411[1] to 411[N] (collectively referred to as "tuning arrangements 411"), where N is a positive integer greater than 1. An output of each tuning arrangement 411 is provided to a corresponding clock output terminal of carrier generator 400, which is coupled to carrier lines TXC (FIG. 1). Output terminals of the tuning arrangements 411 are also coupled to input terminals of a multiplexer 412. Multiplexer 412 includes a select input terminal for receiving an SEL signal and output terminals that are coupled to a reference output terminal of the carrier generator 400. The output terminal of multiplexer 412 is also coupled to an input terminal of a divider 414. An output terminal of divider 414 is coupled to a first input terminal of a time-to-digital converter (TDC) 416. Carrier generator 400 includes a second input terminal that is coupled to a second input terminal of TDC 416. An output terminal of TDC 416 is coupled to a second input terminal of adder 406.

Each tuning arrangement 411 includes a corresponding memory MEM[1] to MEM[N] (collectively referred to as "memory MEM"), where N is a positive integer greater than or equal to 1, and a corresponding digitally controlled oscillator DCO[1] to DCO[N] (collectively referred to as "oscillators DCO"), where N is a positive integer greater than or equal to 1. The input terminal of each tuning arrangement 411 is coupled to an input terminal of a corresponding memory MEM. Output terminals of memories MEM are coupled to input terminals of corresponding oscillators DCO. The output terminals of oscillators DCO are coupled to the output terminals of the tuning arrangements 411, which are coupled to the carrier lines TXC. The oscillators DCO are used to provide adjustment of the phase of the carrier signals S output to the carrier lines TXC.

Including multiple tuning arrangements 411 enables carrier generator 400 to provide carrier signals S to multiple modulators M with a reduced circuit size in comparison with other approaches. In some embodiments, each carrier generator includes a single tuning arrangement 411. However, by sharing phase accumulator 402, adder 406, loop filter 408, demultiplexer 410, multiplexer 412, divider 414 and TDC 416 across multiple tuning arrangements 411, carrier generator 400 has a reduced size in comparison with other approaches. For example, an RFI which includes multiple carrier generators and each carrier generator has a separate PLL; a total size of the carrier generator is greater than carrier generator 400.

In operation, phase accumulator 402 receives the FCW signal by the first input terminal. In response to the FCW signal, phase accumulator 402 generates a reference signal based on the FCW signal and outputs the reference signal. Adder 406 receives the reference signal by a first input terminal and a signal $S_{TDC}$ generated by TDC 416 by the second input terminal. In response to the reference signal and the $S_{TDC}$ signal, adder 406 adds the reference signal to the signal $S_{TDC}$ to generate a control signal based on a phase difference and/or a frequency difference between FCW signal and signal $S_{TDC}$ from the TDC. Loop filter 408 receives the control signal, filters the control signal, and outputs a filtered control signal. In some embodiment, loop filter 408 is a digital filter. In some embodiments, loop filter 408 is a low pass filter configured to pass frequencies below a threshold cutoff frequency. In some embodiments, the threshold cutoff frequency is determined based on an operating frequency of carrier generator 400.

Demultiplexer 410 receives the filtered control signal by the input terminal and receives the SEL signal by the select input terminal. In response to the SEL signal, demultiplexer 410 selects a tuning arrangement 411[n] (where n is a positive integer ranging from 1 to N) to receive the filtered control signal based on a time slot T[n] indicated in the SEL signal, and outputs the filtered control signal on the output terminal coupled to the selected tuning arrangement 411[n]. The corresponding memory MEM[n] of the selected tuning arrangement 411[n] receives the filtered control signal. In some embodiments, memory MEM[n] stores data associated with the filtered control signal. The corresponding oscillator DCO[n] of the selected tuning arrangement 411[n] generates the corresponding carrier signal S[n] based on the filtered control signal stored in the corresponding memory MEM[n]. Each carrier signal S has a corrected frequency or a corrected phase.

While the carrier generator 400 is operational, each tuning arrangement 411[n] is configured to continually output a respective carrier signal S[n]. Based on the SEL signal, each memory MEM[n] of a selected tuning arrangement 411[n] is configured to receive the filtered control signal during a time slot T[n] in time period $T_{PERIOD}$ for correcting the corresponding carrier signal S[n] generated and output by a corresponding oscillator DCO[n]. In some embodiments, each of the tuning arrangements 411 sequentially receive the filtered control signal during each time period $T_{PERIOD}$.

Multiplexer 412 receives the carrier signals S by carrier lines TXC and the SEL signal by the select terminal. In response to the SEL signal, multiplexer 412 sequentially selects a single carrier signal S[n] of carrier signals S. That is, during time period $T_{PERIOD}$, multiplexer 412 time-multiplexes carrier signals S based on SEL signal, and outputs the clock recovery signal $S_{REF}$. In some embodiments, clock recovery signal $S_{REF}$ is an output from multiplexer 412 to a single-ended line and is a reference clock for the receiver 104 (FIG. 1). In some embodiments, the SEL signal received by demultiplexer 410 and multiplexer 412 is a same signal. In some embodiments, the SEL signal received by multiplexer 412 is delayed with respect to the SEL signal received by demultiplexer 410 to account for delay of a signal propagating through tuning arrangement 411 or stored in memory MEM.

Divider 414 receives the clock recovery signal $S_{REF}$, divides the clock recovery signal $S_{REF}$ by a division integer, and outputs the divided signal. In some embodiments, the division integer is a fixed integer. In some embodiments, the division integer is a programmable integer and is determined from an input control signal such as the SEL signal or a user input.

TDC 416 receives the divided clock signal and also receives the reference clock signal DQS by the second input terminal. In response to the reference clock signal DQS and the divided signal, TDC 416 generates a signal $S_{TDC}$ that is input to the adder 406. TDC 416 quantizes the time difference between the reference clock signal DQS and the divided clock signal. TDC 416 outputs the signal $S_{TDC}$ to the adder 406, which receives the signal $S_{TDC}$ to add to the reference signal from phase accumulator 402. In some embodiments, signal $S_{TDC}$ is used to correct the phase or frequency of oscillators DCO. In some embodiments, adder 406, filter 408, demultiplexer 410, tuning arrangement 411, multiplexer 412, divider 414 and TDC 416 are configured to form a single loop. In some embodiments, the output of the carrier generator 400 is fed through the divider 414 back to the input of carrier generator 400 in a negative feedback loop.

Figure 5:
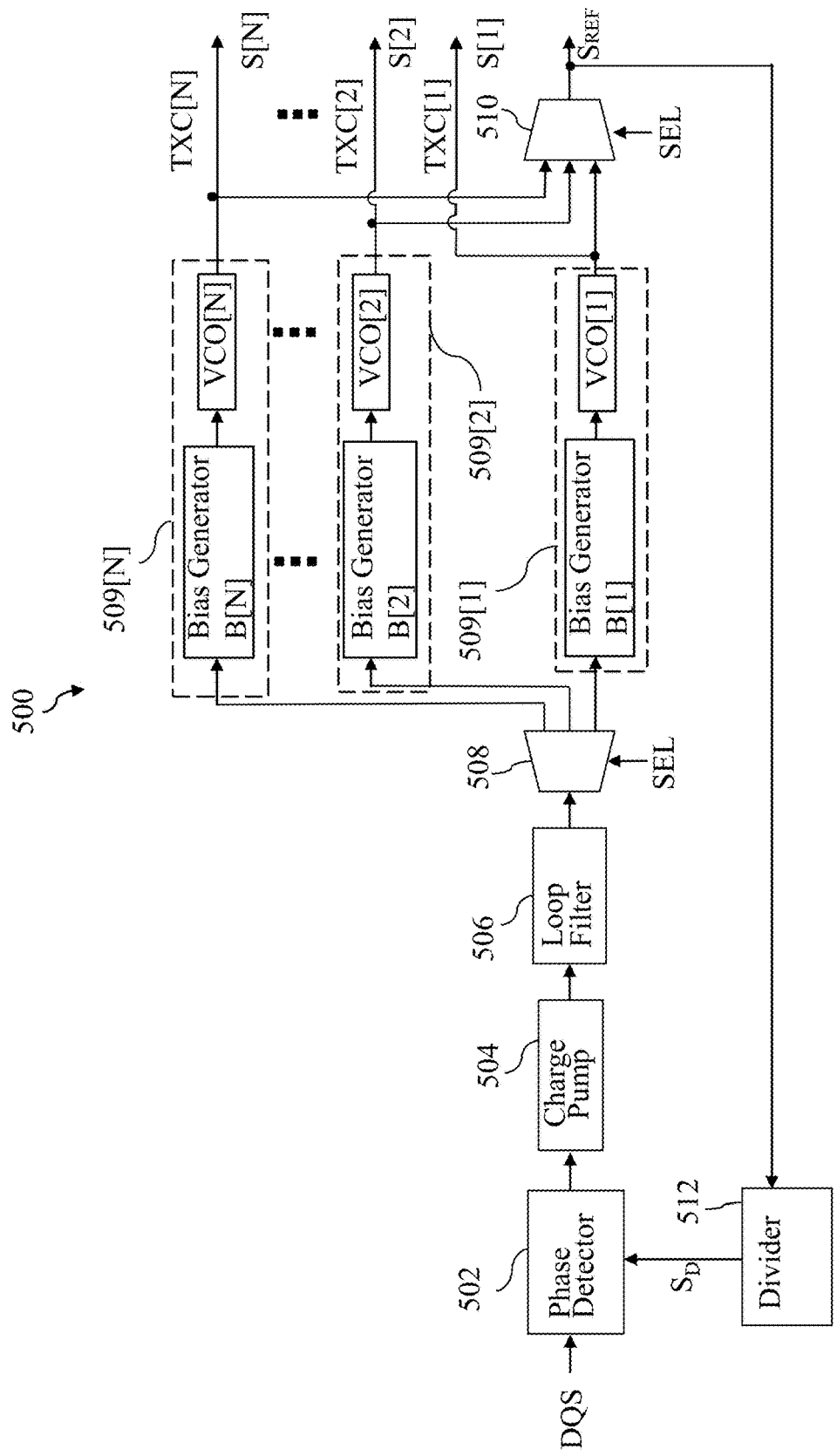
FIG. 5 is a block diagram of a carrier generator for generating carrier signals and for generating a clock recovery signal in an RFI, in accordance with some embodiments.

FIG. 5 is a block diagram of a carrier generator 500 for generating carrier signals S and for generating a clock recovery signal $S_{REF}$ in an RFI, in accordance with some embodiments. In some embodiments, the RFI is RFI 100 (FIG. 1). In some embodiments, carrier generator 500 is usable as multi-carrier generator 210 (FIG. 2). Carrier generator 500 includes a single loop PLL configured to generate the clock recovery signal $S_{REF}$ or the multi-carrier signal. The PLL is configured to allow the carrier signals S' on carrier lines RXC (FIG. 1) to be synchronized in frequency or phase with the carrier signals S on carrier lines TXC. In some embodiments, the PLL also helps to account for phase shifts in the received clock signal resulting from transmission through line 128 (FIG. 1) of the RFI. Carrier generator 500 includes an analog PLL. Carrier generator 500 is configured to synchronize the clock recovery signal with the carrier signals S within a predefined tolerance.

Carrier generator 500 includes a first input terminal coupled to an input terminal of a phase detector 502. An output terminal of phase detector 502 is coupled to an input terminal of a charge pump 504. An output terminal of charge pump 504 is coupled to an input terminal of a loop filter 506. In some embodiments, loop filter 506 is a low pass filter configured to pass frequencies below a threshold cutoff frequency. An output terminal of loop filter 506 is coupled to an input terminal of a demultiplexer 508.

Demultiplexer 508 includes a select input terminal for receiving an SEL signal and output terminals that are coupled to an input terminal of tuning arrangements 509[1] to 509[N] (collectively referred to as "tuning arrangements 509"), where N is a positive integer greater than 1. An output of the tuning arrangements 509 is provided to a corresponding clock output terminal of carrier generator 500, which is coupled to carrier lines TXC, for supplying carrier signals to modulators, e.g., modulators M[N] (FIG. 1). Output terminals of the tuning arrangements 509 are also coupled to input terminals of a multiplexer 510. Multiplexer 510 includes a control input and an output terminal that is connected to a reference output terminal of the carrier generator 500. The output terminal of multiplexer 510 is also coupled to an input terminal of a divider 512. An output terminal of divider 512 is coupled to a second input terminal of phase detector 502.

Each tuning arrangement 509[1] to 509[N] includes corresponding bias generators B[1] to B[N] (collectively referred to as "bias generators B"), where N is a positive integer greater than or equal to 1, and a corresponding voltage controlled oscillators VCO[1] to VCO[N] (collectively referred to as "oscillators VCO"). The input terminal of each tuning arrangement 509[1] to 509[N] is coupled to a corresponding input terminal of a bias generator B[1] to B[N]. Output terminals of each bias generator B[1] to B[N] are coupled to input terminals of corresponding voltage controlled oscillators VCO[1] to VCO[N]. Output terminals of each voltage controlled oscillator VCO[1] to VCO[N] are coupled to the output terminals of the corresponding tuning arrangement 509[1] to 509[N], which are coupled to the carrier lines TXC. In some embodiments, the oscillators VCO are used to provide coarse adjustment of the carrier signals S output to the carrier lines TXC.

Including multiple tuning arrangements 509 enables carrier generator 500 to provide carrier signals S to multiple modulators M with a reduced circuit size in comparison with other approaches. In some embodiments, each carrier generator includes a single tuning arrangement 509. However, by sharing phase detector 502, charge pump 504, loop filter 506, demultiplexer 508, multiplexer 510, and divider 512 across multiple tuning arrangements 509, carrier generator 500 has a reduced size in comparison with other approaches. For example, an RFI which includes multiple carrier generators and each carrier generator includes a separate PLL; a total size of each of the carrier generators is greater than carrier generator 500.

In operation, phase detector 502 receives reference clock signal DQS by the first input terminal of the carrier generator 500. Phase detector 502 also receives a divided signal $T_D$ from divider 512 by the second terminal. Phase detector 502 is configured to generate a detection signal based on a phase difference and/or a frequency difference between reference clock signal DQS and divided signal $T_D$. Phase detector 502 is configured to output the detection signal by the output terminal. In response to receiving the detection signal, charge pump 504 generates and outputs a current pulse signal. Charge pump 504 is configured to generate a pumped voltage based on the detection signal. Loop filter 506 is configured to generate a control signal by low-pass filtering the pumped voltage. In some embodiments, loop filter 506 is a low pass filter configured to pass frequencies below a threshold cutoff frequency. In some embodiments, the threshold cutoff frequency is determined based on an operating frequency of carrier generator 500. Demultiplexer 508 receives the control signal by the first input terminal and the SEL signal by the select terminal. In response to the SEL signal, demultiplexer 508 selects a tuning arrangement 509[n] (where n is a positive integer ranging from 1 to N) to receive the control signal based on a time slot T[n] indicated in the SEL signal, and outputs the control signal on the output terminal coupled to the selected tuning arrangement 509[n]. The selected bias generator B[n] of the selected tuning arrangement 509[n] receives the control signal. The selected bias generator B [n] is configured to generate a bias control signal based on the control signal, and outputs the biased control signal to the input terminal of the corresponding oscillator VCO[n] of the selected tuning arrangement 509[n]. The corresponding oscillator VCO[n] of the selected tuning arrangement 509[n] generates the corresponding carrier signal S[n] based on the bias control signal. Each carrier signal S has a corrected frequency or a corrected phase.

While the carrier generator 500 is operational, each tuning arrangement 509 is configured to continually output a respective carrier signal S[n]. Based on the SEL signal, each bias generator B[n] of a selected tuning arrangement 509[n] is configured to receive the control signal during a time slot T[n] in time period $T_{PERIOD}$ for correcting the carrier signal S[n] generated and output by a corresponding oscillator VCO[n]. In some embodiments, each of the tuning arrangements 509 sequentially receives a control signal during each time period $T_{PERIOD}$.

Multiplexer 510 receives carrier signals S by the input terminals and the SEL signal on the select terminal. In response to the SEL signal, multiplexer 510 sequentially selects a carrier signal S[n] of carrier signals S, and sequentially outputs a carrier signal S[n] at time T[n] during the time period $T_{PERIOD}$. That is, multiplexer 510 time-multiplexes the carrier signals S into the clock recovery signal $S_{REF}$, and output the clock recovery signal $S_{REF}$. In some embodiments, multiplexer 510 outputs the clock recovery signal $S_{REF}$ by a single-ended line to provide a reference clock for the receiver 104 (FIG. 1). In some embodiments, the SEL signal received by demultiplexer 508 and multiplexer 510 is a same signal. In some embodiments, the SEL signal received by multiplexer 510 is delayed with respect to the SEL signal received by demultiplexer 508 to account for delay of a signal propagating through tuning arrangements 509.

The output terminal of multiplexer 510 also provides clock recovery signal $S_{REF}$ to divider 512. In response to receiving the clock recovery signal $S_{REF}$, divider 512 divides the clock recovery signal $S_{REF}$ by a division integer, and outputs the divided signal. In some embodiments, the division integer is a fixed integer. In some embodiments, the division integer is programmable integer and is determined from an input control signal such as the SEL signal. Divider 512 provides the divided signal to phase detector 502. In response to receiving the divided signal, phase detector 502 compares the reference clock signal DQS and the divided signal to determine an amount of correction, generates the detection signal corresponding to the correction amount, and outputs the detection signal. In some embodiments, phase detector 502, charge pump 504, loop filter 506, demultiplexer 508, tuning arrangement 509, multiplexer 510 and divider 512 are configured to form a single loop. In some embodiments, the output of the carrier generator 500 is fed through the divider 512 back to the input of carrier generator 500 in a negative feedback loop.

Figure 6:
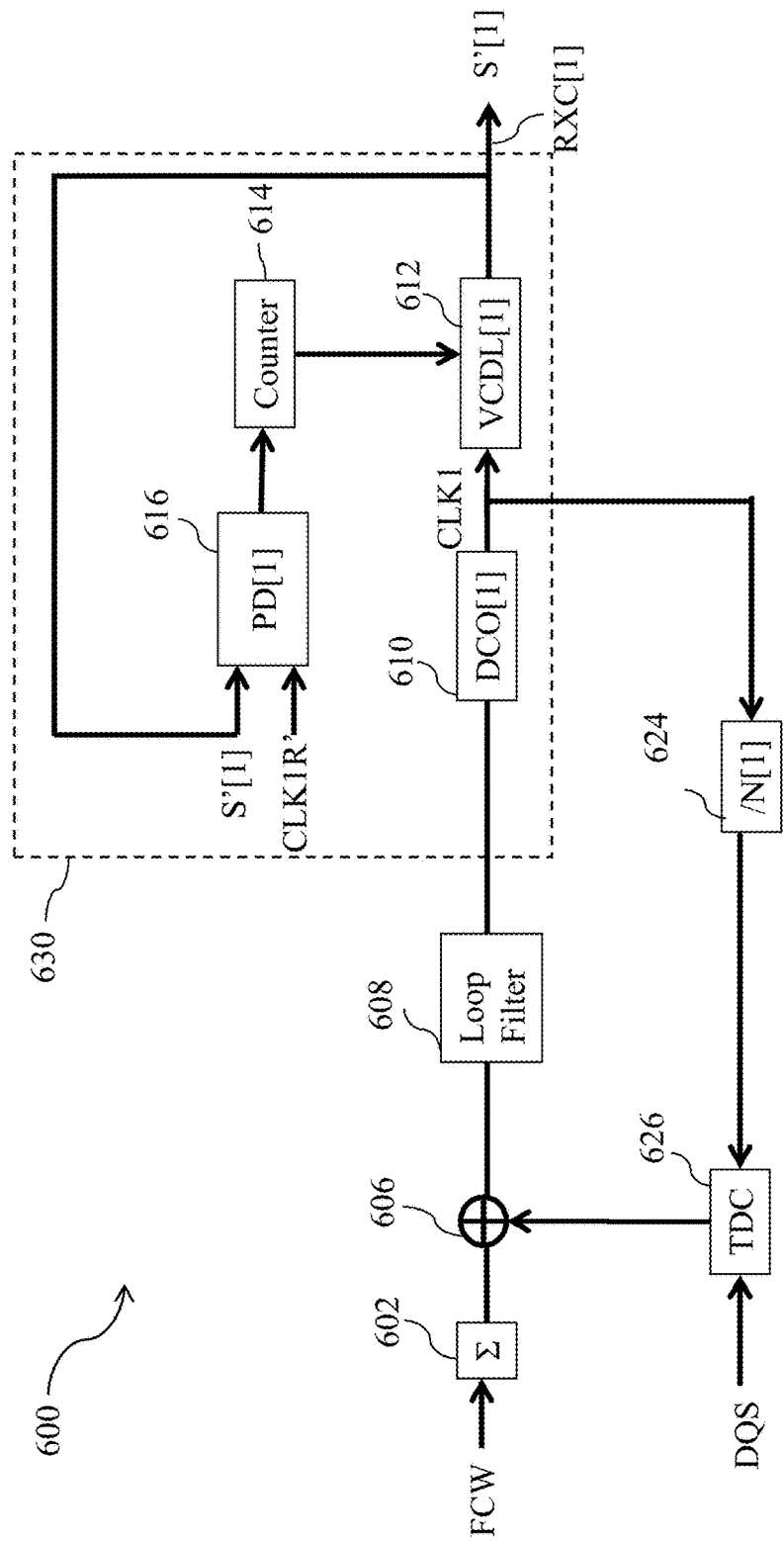
FIG. 6 is a block diagram of a carrier generator for generating carrier signals and for generating a clock recovery signal in an RFI, in accordance with some embodiments.

FIG. 6 is a block diagram of a carrier generator 600 for generating output carrier signals S' in an RFI in accordance with some embodiments. In some embodiments, the RFI is RFI 100 (FIG. 1). In some embodiments, carrier generator 600 is usable as one of carrier generators 270[1], . . . 270[n] (FIG. 2), and received clock signal CLK1' is usable as one of separated reference carrier signals CLK1R to CLKNR (FIG. 2). In these embodiments, received clock signal CLK1R' corresponds to a clock within a specific time period, e.g. T1-T8 (FIG. 3), of a reference carrier signal received by a receiver of the RFI. In some embodiments, clock signal CLK1' is received from a demultiplexer, e.g., demultiplexer 250 (FIG. 2).

Carrier generator 600 includes a PLL configured to allow the carrier signals S' (FIG. 1) on carrier lines RXC to be synchronized in frequency or phase with the carrier signals S on carrier lines TXC. In some embodiments, the PLL helps to account for any phase shift in the received clock signal resulting from transmission through the line of the RFI. An output S'[1] of carrier generator 600 is provided to a corresponding demodulator of the RFI, e.g., demodulators DM of RFI 100 (FIG. 1). In some embodiments, output S'[1] of carrier generator 600 is usable as carrier signals S' (FIG. 1).

Carrier generator 600 includes a first input terminal coupled to an input terminal of a phase accumulator 602. An output terminal of phase accumulator 602 is coupled to a first input terminal of an adder 606. An output terminal of adder 606 is coupled to an input terminal of a loop filter 608. An output terminal of loop filter 608 is coupled to an input terminal of a digitally controlled oscillator (DCO) DCO[1] 610. An output terminal of DCO[1] 610 is coupled to a first input terminal of a voltage controlled delay line (VCDL) VCDL[1] 612 and an input terminal of a divider 624. An output terminal of divider 624 is coupled to a first input terminal of TDC 626. A second input terminal of TDC 626 is connected to a source of reference clock signal DQS. An output terminal of TDC 626 is coupled to a second input terminal of adder 606. An output terminal of VCDL[1] 612 is coupled to a first input terminal of a phase detector (PD) PD[1] 616. A second input terminal of PD[1] 616 is coupled to a source of clock signal CLK1R'. An output terminal of PD[1] 616 is coupled to an input terminal of a counter 614. An output terminal of counter 614 is coupled to a second input terminal of VCDL[1] 612.

In some embodiments, DCO[1] 610, VCDL[1] 612, PD[1] 616 and counter 614 are collectively referred to as a tuning arrangement 630. Tuning arrangement 630 is configured to synchronize the clock recovery signal S' with the carrier signals S or the reference clock signal DQS within a predefined tolerance. In some embodiments, for a first and second carrier generator of the carrier generators 270 (FIG. 2), the DCO[1] 610, VCDL[1] 612, PD[1] 616 and divider 624 (FIG. 6) of the first carrier generator of the carrier generators 270 (FIG. 2) is different from the corresponding DCO[1] 610, VCDL[1] 612, PD[1] 616 and divider 624 (FIG. 6) of the second carrier generator of the carrier generators 270 (FIG. 2). In some embodiments, for a first and second carrier generator of the carrier generators 270 (FIG. 2), one or more of the phase accumulator 602, adder 606, loop filter 608, counter 614 and TDC 626 of the first carrier generator of the carrier generators 270 (FIG. 2) is the same as the corresponding phase accumulator 602, adder 606, loop filter 608, counter 614 and TDC 626 (FIG. 6) of the second carrier generator of the carrier generators 270 (FIG. 2). In some embodiments, the counter 614 (FIG. 6) of the carrier generator 600 is shared by each of the carrier generators 270 (shown in FIG. 1).

The operation of the carrier generator 600 starts when phase accumulator 602 receives a FCW signal by the first input terminal. In response to the FCW signal, phase accumulator 602 generates a reference signal based on the FCW and outputs the reference signal. Adder 606 receives the reference signal by a first input terminal and a signal $S_{TDC}$ generated by TDC 626 by the second input terminal. In response to the reference signal and the $S_{TDC}$ signal, adder 606 adds the reference signal to the signal $S_{TDC}$ to generate a control signal based on a phase difference and/or a frequency difference between FCW signal and signal $S_{TDC}$ from the TDC 626. Loop filter 608 receives the control signal, filters the control signal, and outputs a filtered control signal. In some embodiments, loop filter 608 is a digital filter. In some embodiments, loop filter 608 is a low pass filter configured to pass frequencies below a threshold cutoff frequency. In some embodiments, the threshold cutoff frequency is determined based on an operating frequency of carrier generator 600.

The filtered control signal is provided to DCO[1] 610, and DCO[1] 610 outputs a coarse adjustment signal CLK1. The coarse adjustment signal CLK1 is output to VCDL[1] 612 and divider 624. DCO[1] 610 is used to provide coarse adjustment of the filtered signal output by loop filter 608. The coarse adjustment signal CLK1 is received by VCDL[1] 612; and VCDL[1] 612 outputs a carrier signal S'[1] based on the received input from counter 614 and the coarse adjustment signal CLK1 (from the DCO[1] 610). The carrier signal S'[1] has a corrected frequency or a corrected phase. VCDL[1] 612 is configured to provide fine adjustments to the coarse adjustment signal CLK1 output by DCO[1] 610. In some embodiments, VCDL[1] 612 is configured to provide fine adjustments to the coarse adjustment signal CLK1 based on the count output by counter 614. The carrier signal S'[1] is fed back to PD[1] 616 for comparison with a corresponding received clock signal CLK1R' of the RFI. The result of the comparison in PD[1] 616 is supplied to counter 614.

Divider 624 receives the coarse adjustment signal CLK1, divides the coarse adjustment signal CLK1 by a division integer, and outputs the divided signal. In some embodiments, the division integer is a fixed integer. In some embodiments, the division integer is programmable integer and is determined from an input control signal (not shown). TDC 626 receives the divided signal and also receives reference clock signal DQS by the second input terminal. In response to the clock reference signal DQS and the divided signal, TDC 626 generates a signal $S_{TDC}$ that is input to the adder 606. TDC 626 quantizes the time difference between the clock reference signal DQS and the divided clock signal. TDC 626 outputs the signal $S_{TDC}$ to the adder 606, which receives the signal $S_{TDC}$ to add to the reference signal from phase accumulator 602. In some embodiments, signal $S_{TDC}$ is used to correct the phase or frequency of oscillator DCO[1] 610.

In some embodiments, adder 606, loop filter 608, DCO[1] 610, divider 624 and TDC 626 are configured to form a single loop. In some embodiments, the output of the DCO[1] 610 is fed through the divider 624 back to the input of adder 606 in a negative feedback loop. Carrier generator 600 is configured to synchronize the clock recovery signal S'[1] with the carrier signals S or the reference clock signal DQS within a predefined tolerance.

Figure 7:
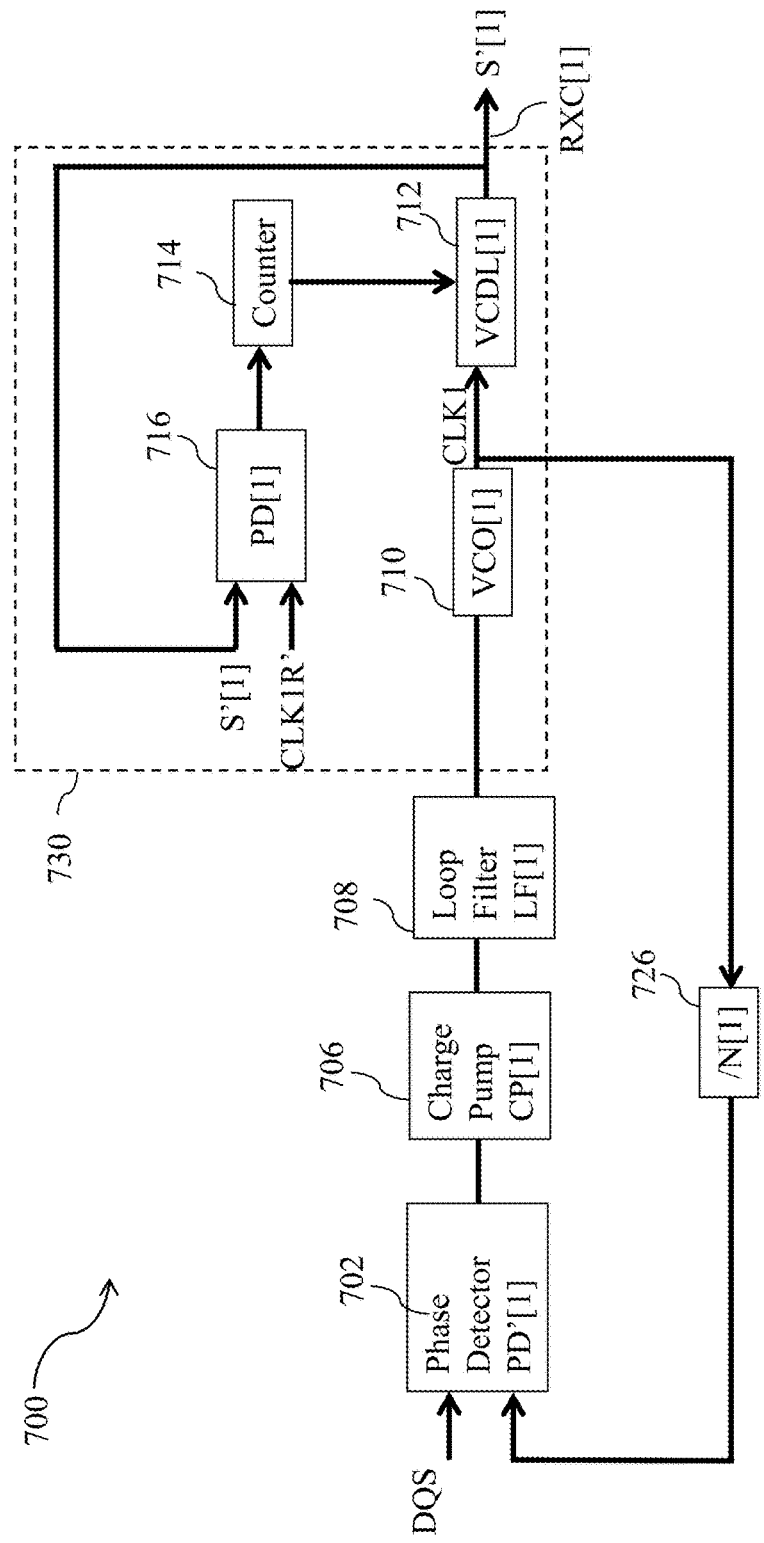
FIG. 7 is a block diagram of a carrier generator for generating carrier signals and for generating a clock recovery signal in an RFI, in accordance with some embodiments.

FIG. 7 is a block diagram of a carrier generator 700 for generating carrier signals S' in an RFI, in accordance with some embodiments. In some embodiments, the RFI is RFI 100 (FIG. 1). In some embodiments, carrier generator 700 is usable as one of carrier generators 270[1], . . . 270[n] (FIG. 2), and received clock signal CLK1R' is usable as one of separated reference carrier signals CLK1R to CLKNR (FIG. 2). In these embodiments, received clock signal CLK1R' corresponds to a clock within a specific time period, e.g. T1-T8 (FIG. 3), of a reference carrier signal received by a receiver of the RFI. In some embodiments, clock signal CLK1' is received from a demultiplexer, e.g., demultiplexer 250 (FIG. 2).

Carrier generator 700 is similar to carrier generator 600 in that tuning arrangement 730 also includes PD[1] 716, counter 714 and VCDL[1] 712. The operation of PD[1] 716, counter 714 and VCDL[1] 712 of tuning arrangement 730 is similar to that described in FIG. 6. However, the tuning arrangement 730 of FIG. 7 includes VCO[1] 710 in contrast to DCO[1] 610 (FIG. 6), respectively.

Carrier generator 700 includes a PLL configured to allow the carrier signals S' (FIG. 1) on carrier lines RXC to be synchronized in frequency or phase with the carrier signals S on carrier lines TXC. In some embodiments, the PLL helps to account for any phase shift in the received clock signal resulting from transmission through the line of the RFI. An output S'[1] of carrier generator 700 is provided to a corresponding demodulator of the RFI, e.g., demodulators DM of RFI 100 (FIG. 1). In some embodiments, output S'[1] of carrier generator 700 is usable as carrier signals S' (FIG. 1). Carrier generator 700 includes a PLL similar to one branch of the shared PLL discussed with respect to carrier generator 500 (FIG. 5).

Carrier generator 700 includes a first input terminal coupled to a first input terminal of a phase detector PD'[1] 702. An output terminal of phase detector PD'[1] 702 is coupled to an input terminal of a charge pump (CP) CP[1] 706. An output terminal of CP[1] 706 is coupled to an input terminal of a loop filter (LF) LF[1] 708. In some embodiments, LF[1] 708 is a low pass filter configured to pass frequencies below a cutoff frequency. An output terminal of LF[1] 708 is coupled to an input terminal of VCO[1] 710. An output terminal of VCO[1] 710 is coupled to a first input terminal of VCDL[1] 712 and an input terminal of a divider 726. An output terminal of divider 726 is coupled to a second input terminal of PD'[1] 702. A first input terminal of PD'[1] 702 is connected to a source of reference clock signal DQS. An output terminal of VCDL[1] 712 is coupled to a first input terminal of a phase detector (PD) PD[1] 716. A second input terminal of PD[1] 716 is coupled to a source of clock signal CLK1R'. An output terminal of PD[1] 716 is coupled to an input terminal of a counter 714. An output terminal of counter 714 is coupled to a second input terminal of VCDL[1] 712.

In some embodiments, VCO[1] 710, VCDL[1] 712, PD[1] 716 and counter 714 are collectively referred to as a tuning arrangement 730. Tuning arrangement 730 is configured to synchronize the clock recovery signal S' with the carrier signals S or the reference clock signal DQS within a predefined tolerance. In some embodiments, for a first and second carrier generator of the carrier generators 270 (FIG. 2), the PD'[1] 702, CP[1] 706, LF[1] 708, VCO[1] 710, VCDL[1] 712, PD[1] 716 and divider 726 (FIG. 7) of the first carrier generator of the carrier generators 270 (FIG. 2) is different from the corresponding PD'[1] 702, CP[1] 706, LF[1] 708, VCO[1] 710, VCDL[1] 712, PD[1] 716 and divider 726 (FIG. 7) of the second carrier generator of the carrier generators 270 (FIG. 2). In some embodiments, for a first and second carrier generator of the carrier generators 270 (FIG. 2), counter 714 (FIG. 7) of the first carrier generator of the carrier generators 270 (FIG. 2) is the same as the corresponding counter 714 (FIG. 7) of the second carrier generator of the carrier generators 270 (FIG. 2). In some embodiments, the counter 714 (FIG. 7) of the carrier generator 700 is shared by each of the carrier generators 270 (shown in FIG. 1).

In operation, PD'[1] 702 receives reference clock signal DQS by the first input terminal of the carrier generator 700. PD'[1] 702 also receives a divided signal from divider 726 by the second terminal. PD'[1] 702 is configured to generate a detection signal based on a phase difference and/or a frequency difference between reference clock signal DQS and divided signal. PD'[1] 702 is configured to output the detection signal by the output terminal. In response to receiving the detection signal, CP[1] 706 generates and outputs a current pulse signal. CP[1] 706 is configured to generate a pumped voltage based on the detection signal. LF[1] 708 is configured to generate a control signal by low-pass filtering the pumped voltage. In some embodiments, LF[1] 708 is a low pass filter configured to pass frequencies below a threshold cutoff frequency. In some embodiments, the threshold cutoff frequency is determined based on an operating frequency of carrier generator 700.

VCO[1] 710 receives the control signal by the first input terminal and outputs a coarse adjustment signal CLK1. The coarse adjustment signal CLK1 is output to VCDL[1] 712 and divider 726. VCO[1] 710 is used to provide coarse adjustment of the filtered signal output by LF[1] 708. The coarse adjustment signal CLK1 is received by VCDL[1] 712; and VCDL[1] 712 outputs a carrier signal S'[1] based on the received input from counter 714 and the coarse adjustment signal CLK1 (from the VCO[1] 710). The carrier signal S'[1] has a corrected frequency or a corrected phase. VCDL[1] 712 is configured to provide fine adjustments to the coarse adjustment signal CLK1 output by VCO[1] 710. In some embodiments, VCDL[1] 712 is configured to provide fine adjustments to the coarse adjustment signal CLK1 based on the count output by counter 714. The carrier signal S'[1] is fed back to PD[1] 716 for comparison with a corresponding received clock signal CLK1R' of the RFI. The result of the comparison in PD[1] 716 is supplied to counter 714.

Divider 726 receives the coarse adjustment signal CLK1, divides the coarse adjustment signal CLK1 by a division integer, and outputs the divided signal. In some embodiments, the division integer is a fixed integer. In some embodiments, the division integer is programmable integer and is determined from an input control signal, such as the SEL signal. PD'[1] 702 receives the divided signal by the second input terminal and also receives the reference clock signal DQS by the first input terminal. In response to receiving the divided signal, PD'[1] 702 compares the reference clock signal DQS and the divided signal to determine an amount of correction, generates the detection signal corresponding to the correction amount, and outputs the detection signal.

In some embodiments, PD'[1] 702, CP[1] 706, LF[1] 708 and divider 726 are configured to form a single loop. In some embodiments, the output of the VCO[1] 710 is fed through the divider 726 back to the input of carrier generator 700 in a negative feedback loop. Carrier generator 700 is configured to synchronize the clock recovery signal S'[1] with the carrier signals S or the reference clock signal DQS within a predefined tolerance.

FIG. 8 is a block diagram of a data packet 800, in accordance with some embodiments. Preamble generator, such as preamble generator 109 (FIG. 1), is configured to generate the preamble portion of data packet 800. Data packet 800 includes data that is received by an input line IN (FIG. 1). Data packet 800 includes a preamble portion that comprises a sequence of bits indicative of a beginning portion of data or an end of a header portion of the data packet. Data packet 800 also includes a destination address portion DESADDR, a burst count portion, a source address portion SADDR, and a cyclic redundancy check (CRC) portion.

Figure 9:
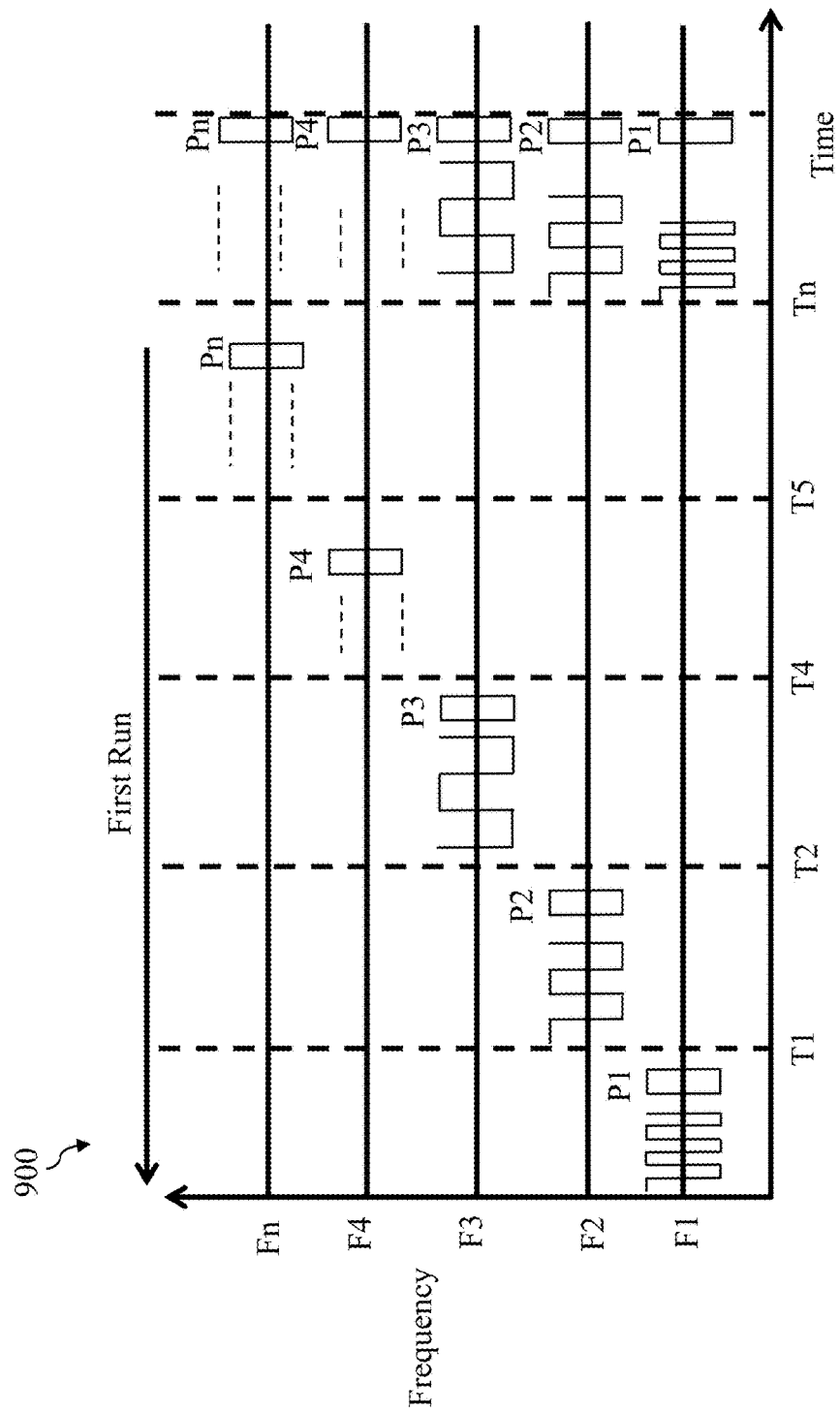
FIG. 9 is a diagram of various clock signals or preamble patterns, in accordance with some embodiments.

FIG. 9 is a diagram of various clock signals and preamble patterns, in accordance with some embodiments.

Each time slot T[1] to T[n] includes a corresponding reference clock signal DQS and a corresponding preamble portion P1 to Pn. In some embodiments, each preamble portion P1 to Pn is used by RFI 100 (FIG. 1) to identify the corresponding reference clock signal DQS to regenerate the carrier signals S'. In some embodiments, the preamble portion P1 to Pn identifies which channel (e.g., time slot T) is transmitted to the receiver 104.

Figure 10:
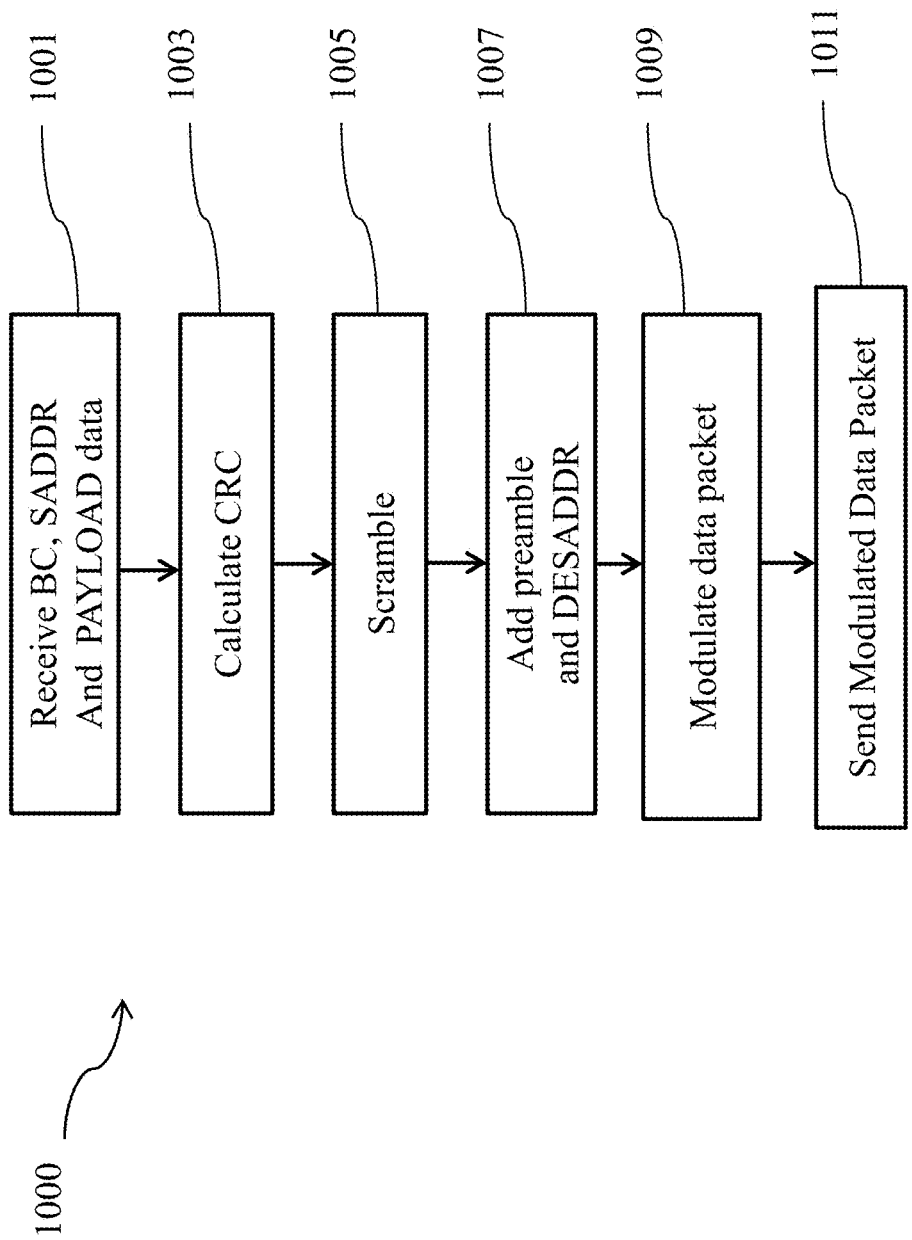
FIG. 10 is a flowchart of a method of transmitting data in an RFI, in accordance with some embodiments.

FIG. 10 is a flowchart of a method 1000 of transmitting data in an RFI, in accordance with some embodiments. In some embodiments, method 1000 is applicable to the diagrams and signals illustrated in conjunction with RFI 100 (FIG. 1).

In step 1001, a first data is received by a transmitter (e.g., transmitter 102 (FIG. 1)). In some embodiments, the first data includes a burst count portion, a source address portion SADDR, and payload data.

In step 1003, the transmitter (e.g., transmitter 102) generates a second data by calculating a cyclic redundancy check on the first data.

In step 1005, the transmitter (e.g., transmitter 102) scrambles the second data.

In step 1007, the transmitter (e.g., transmitter 102) adds a preamble (e.g., preamble portion P1 to Pn (FIG. 9)) and a source address portion SADDR to the scrambled second data. In some embodiments, steps 1001 to 1007 are characterized as generating a data packet.

In step 1009, the data packet (e.g., data packet 800 (FIG. 8)) is modulated using a carrier signal (e.g., carrier signal S (FIG. 1)) generated by a carrier generator (e.g., carrier generator 108). In step 1011, the modulated data packet is sent to the receiver (e.g., receiver 104). In some embodiments, meaningful payload data within the data packet is not transmitted to receiver until the phase is locked or the clock is synchronized between the transmitter and the receiver.

Figure 11:
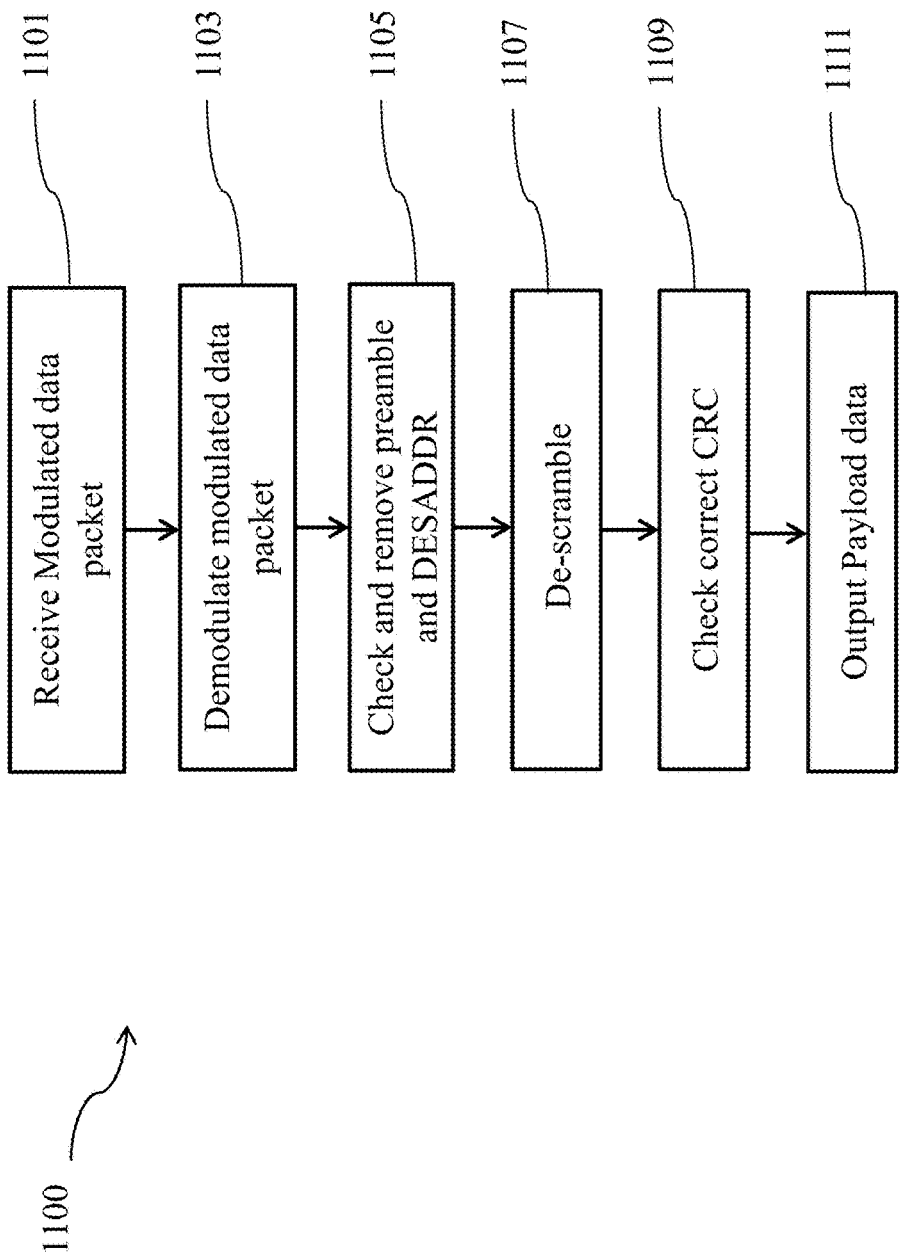
FIG. 11 is a flowchart of a method of receiving data in an RFI, in accordance with some embodiments.

FIG. 11 is a flowchart of a method 1100 of receiving data in an RFI, in accordance with some embodiments. In some embodiments, method 1100 is applicable to the diagrams and signals illustrated in conjunction with RFI 100 (FIG. 1).

In step 1101, a receiver (e.g., receiver 104) receives a modulated data packet.

In step 1103, the receiver (e.g., receiver 104) demodulates the modulated data packet based on regenerated carrier signals (e.g., carrier signals S').

In step 1105, the preamble (e.g., preamble portion P1 to Pn (FIG. 9)) and the source address portion SADDR are removed from the demodulated data packet by the preamble extractor (e.g., preamble extractor 125). In some embodiments, step 1105 is characterized as generating a third data. In some embodiments, third data includes the remaining portion of demodulated data after the preamble (e.g., preamble portion P1 to Pn (FIG. 9)) and the source address portion SADDR are removed from the demodulated data packet. In some embodiments, the preamble extractor (e.g., preamble extractor 125) is configured to separate the demodulated data packet into the preamble and the third data (e.g., the data for the device of the integrated circuit).

In step 1107, the receiver (e.g., receiver 104) de-scrambles the third data.

In step 1109, the receiver (e.g., receiver 104) performs a cyclic redundancy check on the de-scrambled third data.

In step 1111, the receiver (e.g., receiver 104) outputs the payload data. In some embodiments, outputting the payload data includes a step of extracting the payload data from the de-scrambled third data.

FIG. 12 is a flowchart of a method 1200 of synchronizing a transmitter and a receiver for transmission of data in an RFI, in accordance with some embodiments. In some embodiments, method 1200 is applicable to the diagrams and signals illustrated in conjunction with RFI 100 (FIG. 1), carrier synchronization section 200 (FIG. 2), carrier generator 400 (FIG. 4), carrier generator 500 (FIG. 5), carrier generator 600 (FIG. 6) or carrier generator 700 (FIG. 7).

In step 1205, an RFI, e.g., RFI 100 (FIG. 1) is activated. For a period of time following activation of the RFI a transmitter, e.g., transmitter 102 (FIG. 1), and a receiver, e.g., receiver 104, will be out of sync. During this start-up period, a PLL of a carrier generator, e.g., carrier generator 108 (FIG. 1), multi-carrier generator 210 (FIG. 2), carrier generator 400 (FIG. 4), or carrier generator 500 (FIG. 5), will attempt to lock the carrier signal output to modulators of the RFI to the FCW with received clock signals based on a reference signal.

In step 1210, a frequency source, such as a carrier generator, receives a FCW signal and generates a carrier signal based on the FCW signal. The FCW signal is an estimate of an input frequency. The carrier generator, e.g., carrier generator 108 (FIG. 1), multi-carrier generator 210 (FIG. 2), carrier generator 400 (FIG. 4), or carrier generator 500 (FIG. 5), will attempt to lock the carrier signal output to modulators of the RFI to the FCW. In some embodiments, step 1210 also includes modulating data based on the carrier signals output to the modulators.

In step 1215, the carrier signals output to modulators are compared with the FCW to determine whether the PLL of the carrier generator has successfully locked the carrier signal to the FCW. If the comparison made in step 1215 indicates that the PLL has not successfully locked the carrier signal to the FCW, then method 1200 returns to step 1210. If the comparison made in step 1215 indicates that the PLL has successfully locked the carrier signal to the FCW, then method 1200 continues to step 1220. In some embodiments, the comparison made in step 1215 indicates that the carrier signal is locked to the FCW if an error between a frequency and a phase of the carrier signal and a frequency and a phase of the FCW is within a predetermined range. In some embodiments, the predetermined range is selected by a user. In some embodiments, the predetermined range is based on a frequency of the FCW. In some embodiments, a counter is used to determine number of iterations of step 1215 in method 1200. If the number of comparisons exceeds a threshold value, indicating the PLL is on a runaway, and unlikely to lock the carrier signal to the FCW, then the RFI is restarted and the counter is reset to zero. Runaway occurs when a frequency of an output of PLL is so high that a divider in the PLL fails to accurately respond to the output frequency, i.e., an output frequency that is too high causes a PLL to diverge from the FCW instead of converging to the FCW, in some instances.

In step 1220, a clock recovery signal is generated and transmitted. The clock recovery signal is transmitted within the RFI in a time division multiplexing scheme. The clock recovery signal includes a plurality of clock signals, e.g., CLK1, CLK2, CK3, CLKn. Each clock signal is transmitted within a corresponding time slot, e.g., time slots T1-T8 (FIG. 3), from the transmitter to the receiver of the RFI.

In step 1225, a carrier generator of the receiver adjusts carrier signals based on the received clock recovery signal. After adjusting the carrier signal, a determination is made in step 1225 whether the frequency and the phase of the carrier signal are settled within a predetermined range of the received clock recovery signal. If the frequency and the phase of the carrier signal are not settled within the predetermined range of the received clock recovery signal, the method returns to step 1220 to continue transmitting and receiving the clock recovery signal. If the frequency and phase of the regenerated carrier signal are settled within the predetermined range of the received clock recovery signal, the method proceeds to step 1230.

In step 1230, a determination is made whether the carrier signals of the receiver are synchronized with the carrier signals of the transmitter and, therefore, data transmission can begin because the receiver is able to precisely demodulate the transmitted data using the carrier signals of the receiver.

An aspect of this description is related to a radio frequency interconnect. The radio frequency interconnect comprises a transmission line having an input end and an output end, a receiver coupled with the output end of the transmission line, and a transmitter coupled with the input end of the transmission line. The transmitter comprises a first carrier generator configured to generate a clock recovery signal based on a carrier signal, to output a reference clock signal associated with the clock recovery signal, and to transmit the clock recovery signal to the receiver by a line. The transmitter also comprises a modulator configured to modulate a data packet based on the carrier signal. The data packet comprises data for a device of an integrated circuit. The transmitter also comprises a preamble generator configured to generate and add a preamble to the data to generate the data packet. The preamble comprises a data sequence associated with the reference clock signal. The transmitter further comprises a transmitter output configured to transmit the modulated data packet to the receiver by the transmission line.

Another aspect of this description relates to a method of data communication in a radio frequency interconnect, the method comprises generating a clock recovery signal based on a carrier signal. The method also comprises outputting a reference clock signal associated with the clock recovery signal. The method further comprises generating a preamble comprising a data sequence associated with the reference clock signal. The method additionally comprises adding the preamble to payload data to be transmitted to a receiver, wherein adding the preamble to the payload data generates a data packet. The method also comprises modulating the data packet based on the carrier signal. The method further comprises transmitting the clock recovery signal to the receiver by a line. The method additionally comprises transmitting the data packet to the receiver by a transmission line.

A further aspect of this description relates to a radio frequency interconnect. The radio frequency interconnect comprises a transmission line having an input end and an output end, a transmitter coupled with the input end of the transmission line, and a receiver coupled with the output end of the transmission line. The receiver comprises a first carrier generator configured to receive a reference clock signal and a clock recovery signal to regenerate a carrier signal based on the clock recovery signal. The receiver also comprises a demodulator configured to demodulate a modulated data packet received from the transmitter based on the regenerated carrier signal to recover a data packet. The receiver further comprises a preamble extraction unit configured to separate the recovered data packet into a preamble and data for a device of an integrated circuit. The preamble comprises a data sequence associated with the reference clock signal. The receiver also comprises a receiver output configured to output the data for the device of the integrated circuit.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A radio frequency interconnect, comprising:
   a transmission line having an input end and an output end;
   a receiver coupled with the output end of the transmission line, the receiver comprising at least one demultiplexer coupled with at least two demodulators; and
   a transmitter coupled with the input end of the transmission line, the transmitter comprising:
      a first carrier generator configured to generate a clock recovery signal based on a carrier signal, to output a reference clock signal associated with the clock recovery signal, and to transmit the clock recovery signal to the receiver by a line, wherein the clock recovery signal and the reference clock signal are distinct signals produced (a) by the transmitter and (b) independently from the receiver, and wherein the clock recovery signal is a time multiplexed signal of carrier signals;
      a modulator configured to modulate a data packet based on the carrier signal, the data packet comprising data for a device of an integrated circuit;
      a preamble generator configured to generate and add a preamble to the data to generate the data packet, wherein the preamble comprises a data sequence associated with the reference clock signal; and
      a transmitter output configured to transmit the modulated data packet to the receiver by the transmission line.

2. The radio frequency interconnect of claim 1, wherein the transmitter output is further configured to transmit the reference clock signal to the receiver.

3. The radio frequency interconnect of claim 1, wherein the receiver comprises:
   a second carrier generator configured to receive the clock recovery signal to regenerate the carrier signal based on the clock recovery signal;
   a demodulator configured to demodulate the modulated data packet based on the regenerated carrier signal to recover the data packet;
   a preamble extractor configured to separate the recovered data packet into the preamble and the data for the device of the integrated circuit; and
   a receiver output configured to output the data for the device of the integrated circuit.

4. The radio frequency interconnect of claim 3, wherein the second carrier generator comprises:
   a loop filter; and
   a plurality of tuning arrangements, wherein each tuning arrangement of the plurality of tuning arrangements is configured to receive an output of the loop filter, and each tuning arrangement of the plurality of tuning arrangements comprises:
      an electronic oscillator configured to receive the output of the loop filter;
      a voltage controlled delay line (VCDL) configured to receive an output of the electronic oscillator, and to provide a tuning arrangement output;
      a first phase detector configured to receive a corresponding clock recovery signal and a feedback signal from a corresponding tuning arrangement output; and
      a counter configured to receive an output of the first phase detector and to provide an output to the VCDL.

5. The radio frequency interconnect of claim 4, wherein the corresponding tuning arrangement output is a synchronized clock recovery signal, and the plurality of tuning arrangements are configured to synchronize the clock recovery signal with the reference clock signal within a predefined tolerance.

6. The radio frequency interconnect of claim 4, wherein the electronic oscillator is a digital controlled oscillator (DCO).

7. The radio frequency interconnect of claim 4, wherein the electronic oscillator is a voltage controlled oscillator (VCO).

8. The radio frequency interconnect of claim 4, further comprising:
   a second phase detector configured to receive the reference clock signal and a divided output of the corresponding tuning arrangement output, and configured to output a detected signal, wherein the output of the loop filter is based on the detected signal.

9. The radio frequency interconnect of claim 4, further comprising:
   a charge pump configured to receive a detected signal, and configured to output a pumped signal to the loop filter.

10. The radio frequency interconnect of claim 4, wherein the second carrier generator further comprises:
    a phase accumulator configured to receive a frequency command word (FCW) signal; and
    an adder connected to the phase accumulator,
    wherein the loop filter is configured to receive an output of the adder.

11. The radio frequency interconnect of claim 10, wherein the second carrier generator further comprises:
    a time to digital converter configured to receive the reference clock signal and a divided output of the corresponding tuning arrangement output,
    wherein the output of the adder is based on an output of the time to digital converter and an output of the phase accumulator.

12. The radio frequency interconnect of claim 4, wherein the loop filter comprises a low pass filter.

13. A method of data communication in a radio frequency interconnect, the method comprising:
    generating a clock recovery signal based on a carrier signal, wherein the clock recovery signal is a multi-carrier signal;
    outputting a reference clock signal associated with the clock recovery signal;
    generating a preamble comprising a data sequence associated with the reference clock signal;
    adding the preamble to a payload data to be transmitted to a receiver, wherein adding the preamble to the payload data generates a data packet;
    modulating the data packet based on the carrier signal;
    adjusting a phase of the clock recovery signal until the phase of the clock recovery signal is within a predefined tolerance of the reference clock signal;

transmitting the clock recovery signal to the receiver by a line; and transmitting the data packet to the receiver by a transmission line.

14. The method of claim 13, further comprising:

separating the data packet into the preamble and the payload data by a preamble extractor included in the receiver;

regenerating the carrier signal based on the clock recovery signal and the reference clock signal;

demodulating the modulated data packet, the demodulating being based on the regenerated carrier signal; and outputting data.

15. The method of claim 14, wherein the phase of the clock recovery signal is settled within the predefined tolerance of the reference clock signal prior to outputting the data.

16. A radio frequency interconnect, comprising:

a transmission line having an input end and an output end;

a transmitter coupled with the input end of the transmission line; and a receiver coupled with the output end of the transmission line, the receiver comprising:

a first carrier generator configured to receive a reference clock signal and a clock recovery signal to regenerate a carrier signal based on the clock recovery signal, wherein the clock recovery signal is a multi-carrier signal, and the clock recovery signal and the reference clock signal are distinct signals produced (a) by the transmitter and (b) independently from the receiver;

a demodulator configured to demodulate a modulated data packet received from the transmitter based on the regenerated carrier signal to recover a data packet;

a preamble extraction unit configured to separate the recovered data packet into a preamble and data for a device of an integrated circuit, the preamble comprising a data sequence associated with the reference clock signal; and a receiver output configured to output the data for the device of the integrated circuit, wherein the first carrier generator comprises a plurality of tuning arrangements, including a first tuning arrangement configured to adjust a phase of the carrier signal.

17. The radio frequency interconnect of claim 16, wherein the transmitter comprises:

a second carrier generator configured to generate the clock recovery signal based on a generated carrier signal, and to transmit the clock recovery signal to the receiver by a line;

a modulator configured to modulate the data packet received by the receiver based on the generated carrier signal; and a preamble generator coupled with the second carrier generator and with the modulator, the preamble generator being configured to generate and add the preamble to the data for the device of the integrated circuit to generate the data packet, wherein the data packet is communicated to the receiver by the transmission line.

18. The radio frequency interconnect of claim 16, wherein the first carrier generator comprises:

a loop filter, wherein each tuning arrangement of the plurality of tuning arrangements is configured to receive an output of the loop filter, and each tuning arrangement of the plurality of tuning arrangements comprises:

an electronic oscillator configured to receive the output of the loop filter;

a first voltage controlled delay line (VCDL) configured to receive an output of the electronic oscillator, and to provide a tuning arrangement output;

a first phase detector configured to receive a corresponding clock recovery signal and a feedback signal from a corresponding tuning arrangement output; and a first counter configured to receive an output of the first phase detector and to provide an output to the first VCDL.

19. The radio frequency interconnect of claim 18, wherein the electronic oscillator is a digital controlled oscillator (DCO) or a voltage controlled oscillator (VCO).

20. The radio frequency interconnect of claim 18, wherein the first carrier generator further comprises at least one of the following configurations: (a) a second phase detector and a charge pump; or (b) a phase accumulator, an adder, and a time to digital converter, wherein when the first carrier generator further comprises the second phase detector and the charge pump:

the second phase detector is configured to receive the reference clock signal and a divided output of the corresponding tuning arrangement output, and is configured to output a detected signal;

the charge pump is configured to receive the detected signal, and is configured to output a pumped signal to the loop filter; and the output of the loop filter is based on the pumped signal; and when the first carrier generator further comprises the phase accumulator, the adder, and the time to digital converter:

the phase accumulator is configured to receive a frequency command word (FCW) signal;

the adder is connected to the phase accumulator;

the loop filter is configured to receive an output of the adder;

the time to digital converter is configured to receive the reference clock signal and the divided output of the corresponding tuning arrangement output; and the output of the adder is based on an output of the time to digital converter and an output of the phase accumulator.

* * * * *